US009449464B2

(12) United States Patent
Nicely et al.

(10) Patent No.: US 9,449,464 B2
(45) Date of Patent: Sep. 20, 2016

(54) GAMING SYSTEM, GAMING DEVICE, AND METHOD PROVIDING A GAME HAVING AN OBSTACLE BOARD WITH FALLING SYMBOLS

(75) Inventors: Mark C. Nicely, Daly, CA (US); Jason D. Kremer, Reno, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 471 days.

(21) Appl. No.: 13/219,249

(22) Filed: Aug. 26, 2011

(65) Prior Publication Data

US 2013/0053123 A1 Feb. 28, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ......... *G07F 17/326* (2013.01); *G07F 17/3297* (2013.01)

(58) Field of Classification Search
CPC ............... G07F 17/32; G07F 17/3262; G07F 17/3211; G07F 17/326; G07F 17/3297; A63F 13/10
USPC ...................................................... 463/16, 20
See application file for complete search history.

(56) References Cited

U.S. PATENT DOCUMENTS

| | | | |
|---|---|---|---|
| 2,743,108 | A | 4/1956 | Sanders |
| 3,904,207 | A | 9/1975 | Gold |
| 4,448,419 | A | 5/1984 | Telnaes |
| 4,582,324 | A | 4/1986 | Koza et al. |
| 4,618,150 | A | 10/1986 | Kimura |

(Continued)

FOREIGN PATENT DOCUMENTS

| | | |
|---|---|---|
| AU | 738686 | 9/1991 |
| EP | 0 449 433 | 10/1991 |

(Continued)

OTHER PUBLICATIONS

Kazoingo Advertisement, Mikohn Corporation, Copyright 2003 (1 page).
Liberty Ball Advertisement, Mikohn Corporation, Copyright 2003 (1 page).

*Primary Examiner* — Omkar Deodhar
*Assistant Examiner* — Wei Lee
(74) *Attorney, Agent, or Firm* — Neal, Gerber & Eisenberg LLP

(57) ABSTRACT

A gaming system providing a falling symbol obstacle board game. The gaming system displays a symbol starting position, a plurality of symbol ending positions, and a plurality of obstacles. The gaming system selects one of a plurality of symbols, displays the symbol moving from the symbol starting position into one of the symbol ending positions along one of a plurality of symbol paths through the obstacles, and displays the symbol at the symbol ending position at the end of the symbol path. The gaming system repeats selecting symbols, displaying the symbol moving from the symbol starting position to a symbol ending positions along a symbol path, and displaying the symbol at the symbol ending position at the end of the symbol path until a termination condition is satisfied, after which the gaming system determines whether any winning combinations of the symbols are displayed at the symbol ending positions.

40 Claims, 25 Drawing Sheets

(56) References Cited

U.S. PATENT DOCUMENTS 4,695,053 A 9/1987 Vazquez, Jr. et al.
4,775,155 A 10/1988 Lees
4,856,787 A 8/1989 Itkis
4,871,171 A 10/1989 Rivero
5,016,879 A 5/1991 Parker et al.
5,116,055 A 5/1992 Tracy
5,120,060 A 6/1992 Parker et al.
5,131,655 A 7/1992 Ugawa
5,205,555 A 4/1993 Hamano
5,342,047 A 8/1994 Heidel et al.
5,342,049 A 8/1994 Wichinsky et al.
5,393,057 A 2/1995 Marnell, II
5,393,061 A 2/1995 Manship et al.
5,407,200 A 4/1995 Zalabah
5,411,271 A 5/1995 Mirando
5,449,173 A 9/1995 Thomas et al.
5,509,655 A 4/1996 Ugawa
5,524,888 A 6/1996 Heidel
5,536,016 A 7/1996 Thompson
5,611,730 A 3/1997 Weiss
5,639,089 A 6/1997 Matsumoto et al.
5,641,730 A 6/1997 Brown
5,645,486 A 7/1997 Nagao et al.
5,653,636 A 8/1997 Takemoto et al.
5,695,188 A 12/1997 Ishibashi
5,755,619 A 5/1998 Matsumoto et al.
5,769,716 A * 6/1998 Saffari et al. .................. 463/20
5,788,230 A 8/1998 Krise et al.
5,788,573 A 8/1998 Baerlocher et al.
5,823,873 A 10/1998 Moody
5,823,874 A 10/1998 Adams
5,833,536 A 11/1998 Davids et al.
5,833,537 A 11/1998 Barrie
5,836,819 A 11/1998 Ugawa
5,848,932 A 12/1998 Adams
5,851,148 A 12/1998 Brune et al.
5,873,781 A 2/1999 Keane
5,882,261 A 3/1999 Adams
5,890,962 A 4/1999 Takemoto
5,893,718 A 4/1999 O'Donnell
5,904,352 A 5/1999 Takemoto
5,927,714 A 7/1999 Kaplan
5,935,002 A 8/1999 Falciglia
5,947,820 A 9/1999 Morro et al.
5,951,009 A 9/1999 Miyamoto et al.
5,951,397 A 9/1999 Dickinson
5,976,016 A 11/1999 Moody et al.
5,980,384 A 11/1999 Barrie
5,997,401 A 12/1999 Crawford
6,007,066 A 12/1999 Moody
6,015,346 A 1/2000 Bennett
6,019,369 A 2/2000 Nakagawa et al.
6,047,963 A 4/2000 Pierce et al.
6,056,642 A 5/2000 Bennett
6,059,289 A 5/2000 Vancura
6,059,658 A 5/2000 Mangano et al.
6,071,192 A 6/2000 Weiss
6,089,976 A 7/2000 Schneider et al.
6,089,978 A 7/2000 Adams
6,093,102 A 7/2000 Bennett
6,102,798 A 8/2000 Bennett
6,120,377 A 9/2000 McGinnis, Sr. et al.
6,126,542 A 10/2000 Fier
6,126,547 A 10/2000 Ishimoto
6,135,884 A 10/2000 Hedrick et al.
6,139,013 A 10/2000 Pierce et al.
6,142,873 A 11/2000 Weiss et al.
6,142,874 A 11/2000 Kodachi et al.
6,142,875 A 11/2000 Kodachi et al.
6,159,095 A 12/2000 Frohm et al.
6,159,096 A 12/2000 Yoseloff
6,159,097 A 12/2000 Gura
6,159,098 A 12/2000 Slomiany et al.
6,165,070 A 12/2000 Nolte et al.
6,174,235 B1 1/2001 Walker et al.
6,176,487 B1 1/2001 Eklund et al.
6,179,710 B1 1/2001 Sawyer et al.
6,186,894 B1 2/2001 Mayeroff
6,203,008 B1 3/2001 Krise et al.
6,203,009 B1 3/2001 Sines et al.
6,210,279 B1 4/2001 Dickinson
6,220,593 B1 4/2001 Pierce et al.
6,261,177 B1 7/2001 Bennett
6,267,669 B1 7/2001 Luciano, Jr. et al.
6,270,408 B1 8/2001 Sakamoto et al.
6,270,412 B1 8/2001 Crawford et al.
6,296,568 B1 10/2001 Tracy
6,315,664 B1 11/2001 Baerlocher et al.
6,340,158 B2 1/2002 Pierce et al.
6,347,996 B1 2/2002 Gilmore et al.
6,398,219 B1 6/2002 Pierce et al.
6,398,644 B1 6/2002 Perrie et al.
6,419,225 B2 7/2002 Sines et al.
6,419,226 B2 7/2002 Krise et al.
6,428,412 B1 8/2002 Anderson et al.
6,443,837 B1 9/2002 Jaffe et al.
6,461,241 B1 10/2002 Webb et al.
6,464,582 B1 10/2002 Baerlocher et al.
6,481,713 B2 11/2002 Perrie et al.
6,482,089 B2 11/2002 Demar et al.
6,506,114 B1 1/2003 Estes et al.
6,533,658 B1 3/2003 Walker et al.
6,547,242 B1 4/2003 Sugiyama et al.
6,582,307 B2 * 6/2003 Webb .............................. 463/22
6,645,073 B2 11/2003 Lemay et al.
6,652,378 B2 11/2003 Cannon et al.
6,656,040 B1 12/2003 Brosnan et al.
6,666,766 B2 * 12/2003 Baerlocher et al. ............ 463/16
6,682,419 B2 1/2004 Webb et al.
6,682,420 B2 1/2004 Webb et al.
6,769,982 B1 8/2004 Brosnan
6,851,674 B2 2/2005 Pierce et al.
6,857,958 B2 2/2005 Osawa
6,896,261 B2 5/2005 Pierce et al.
7,052,011 B2 5/2006 Pierce et al.
7,513,828 B2 4/2009 Nguyen et al.
7,862,419 B2 1/2011 Baerlocher et al.
2002/0045472 A1 4/2002 Adams
2002/0094855 A1 7/2002 Berman
2002/0094856 A1 * 7/2002 Bennett et al. ................. 463/16
2002/0198036 A1 12/2002 Baerlocher et al.
2003/0064772 A1 4/2003 Tempest et al.
2003/0064785 A1 4/2003 Stone et al.
2003/0069064 A1 4/2003 Ainsworth
2003/0104860 A1 6/2003 Cannon et al.
2003/0207709 A1 11/2003 Paotrakul
2003/0207710 A1 11/2003 Rodgers et al.
2004/0029631 A1 2/2004 Duhamel
2004/0053673 A1 3/2004 Mishra
2004/0053683 A1 3/2004 Hartl et al.
2004/0072619 A1 4/2004 Brosnan et al.
2004/0106446 A1 6/2004 Cannon et al.
2004/0152509 A1 8/2004 Hornik et al.
2005/0014554 A1 1/2005 Walker et al.
2005/0037838 A1 2/2005 Dunaevsky et al.

FOREIGN PATENT DOCUMENTS

EP 0 874 337 10/1998
EP 0 945 837 9/1999
EP 0 984 408 3/2000
EP 0 984 409 3/2000

(56) References Cited

FOREIGN PATENT DOCUMENTS

| | | | |
|---|---|---|---|
| GB | 2 117 952 | | 10/1983 |
| GB | 2 137 392 | A | 10/1984 |
| GB | 2 170 636 | A | 8/1986 |
| GB | 2 191 030 | | 12/1987 |
| GB | 2 341 262 | | 3/2000 |
| WO | WO 00/12186 | | 3/2000 |
| WO | WO 2004/078297 | | 9/2004 |
| WO | WO 2005/094954 | | 10/2005 |

* cited by examiner

GAMING SYSTEM, GAMING DEVICE, AND METHOD PROVIDING A GAME HAVING AN OBSTACLE BOARD WITH FALLING SYMBOLS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

There are a variety of games to play in casinos and other gaming environments, such as online gaming environments, that involve the use of an obstacle board such as a peg board. One such known game utilizes a quincunx board, also known as a plinko or Galton board. One mechanical quincunx board is a vertical board including a plurality of pins, pegs, or nails arranged in an array. Each pin, peg, or nail is equidistant from each of the pins, pegs, or nails adjacent to it. During play of the game, balls or discs are dropped from the top of the quincunx board. As gravity pulls the balls or discs through the array of pins, pegs, or nails, the balls or discs collide with the pins, pegs, or nails and change direction, speed, and/or rotation as a result. Eventually, the balls or discs reach the bottom of the quincunx board and are collected into bins. Computerized or video games that mimic a mechanical quincunx board have also been implemented.

Pachinko is another such known game. A mechanical pachinko machine includes of a network of mechanical pins, pegs, or nails spaced apart in a predefined, sometimes irregular manner extending from a board or background. The pachinko machine utilizes small steel balls. The player places a wager on the pachinko game and receives a number of the balls in a loading area. In one known system, the player pulls a spring-loaded pinball-like handle or knob and shoots a single ball into an upright or angled play area where the ball bounces from one pin, peg, or nail to another, through the network of pegs or nails. In another known system, the player sets a motor speed so that the ball speed falls somewhere between barely entering the play area to entering the play area at a high rate of speed. In either system, the ball falls through the network of pins, pegs, or nails either unsuccessfully to the bottom of the play area or successfully into a winning pocket, whereby the player wins a prize. Computerized or video pachinko games that mimic a mechanical pachinko game have also been implemented.

Games involving a quincunx board and pachinko games are simple, interactive, and considered by many to be fun and exciting to watch or play. Accordingly, these games make for an entertaining primary or bonus game in a gaming device, and there is a need to increase the level of interest, excitement, and volatility associated with playing these games.

SUMMARY

Various embodiments of the present disclosure provide a gaming system and method providing a falling symbol obstacle board game. In one embodiment, the gaming system receives a wager from a player for a play of the falling symbol obstacle board game. The gaming system displays a symbol starting area including at least one symbol starting position; a symbol ending area including a plurality of symbol ending positions, each of which is configured to display one of a plurality of different symbols, and a plurality of obstacles. The symbol starting area is spaced apart in relation to the symbol ending area, and the obstacles are positioned between the symbol starting area and the symbol ending area. The gaming system selects one of the symbols. The gaming system displays the selected symbol moving from the at least one symbol starting position into one of the symbol ending positions along one of a plurality of different symbol paths through the obstacles based on the interaction of the moving selected symbol with the obstacles. The gaming system displays the selected symbol at the symbol ending position at the end of the symbol path. The gaming system repeats selecting symbols, displaying the selected symbol moving from the at least one symbol starting position through the obstacles into one of the symbol ending positions, and displaying the selected symbol at the symbol ending position at the end of the symbol path until a termination condition is satisfied. After the termination condition is satisfied, the gaming system determines whether at least one of a plurality of different predetermined winning combinations of the symbols is displayed at the symbol ending positions and provides the player an award for any displayed winning symbol combinations.

In another embodiment, the gaming system receives a wager from a player for a play of the falling symbol obstacle board game. The gaming system displays a symbol starting area including at least one symbol starting position; a symbol ending area including a plurality of symbol ending positions, each of which is configured to display one of a plurality of different symbols, and a plurality of obstacles. A plurality of the obstacles are positioned within the symbol ending area. The gaming system selects one of the symbols. The gaming system displays the selected symbol moving from the at least one symbol starting position into one of the symbol ending positions along one of a plurality of different symbol paths through the obstacles based on the interaction of the moving selected symbol with the obstacles. The gaming system displays the selected symbol at the symbol ending position at the end of the symbol path. The gaming system repeats selecting symbols, displaying the selected symbol moving from the at least one symbol starting position through the obstacles into one of the symbol ending positions, and displaying the selected symbol at the symbol ending position at the end of the symbol path until a termination condition is satisfied. After the termination condition is satisfied, the gaming system determines whether at least one of a plurality of different predetermined winning combinations of the symbols is displayed at the symbol ending positions and provides the player an award for any displayed winning symbol combinations.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network (such as the Internet) after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
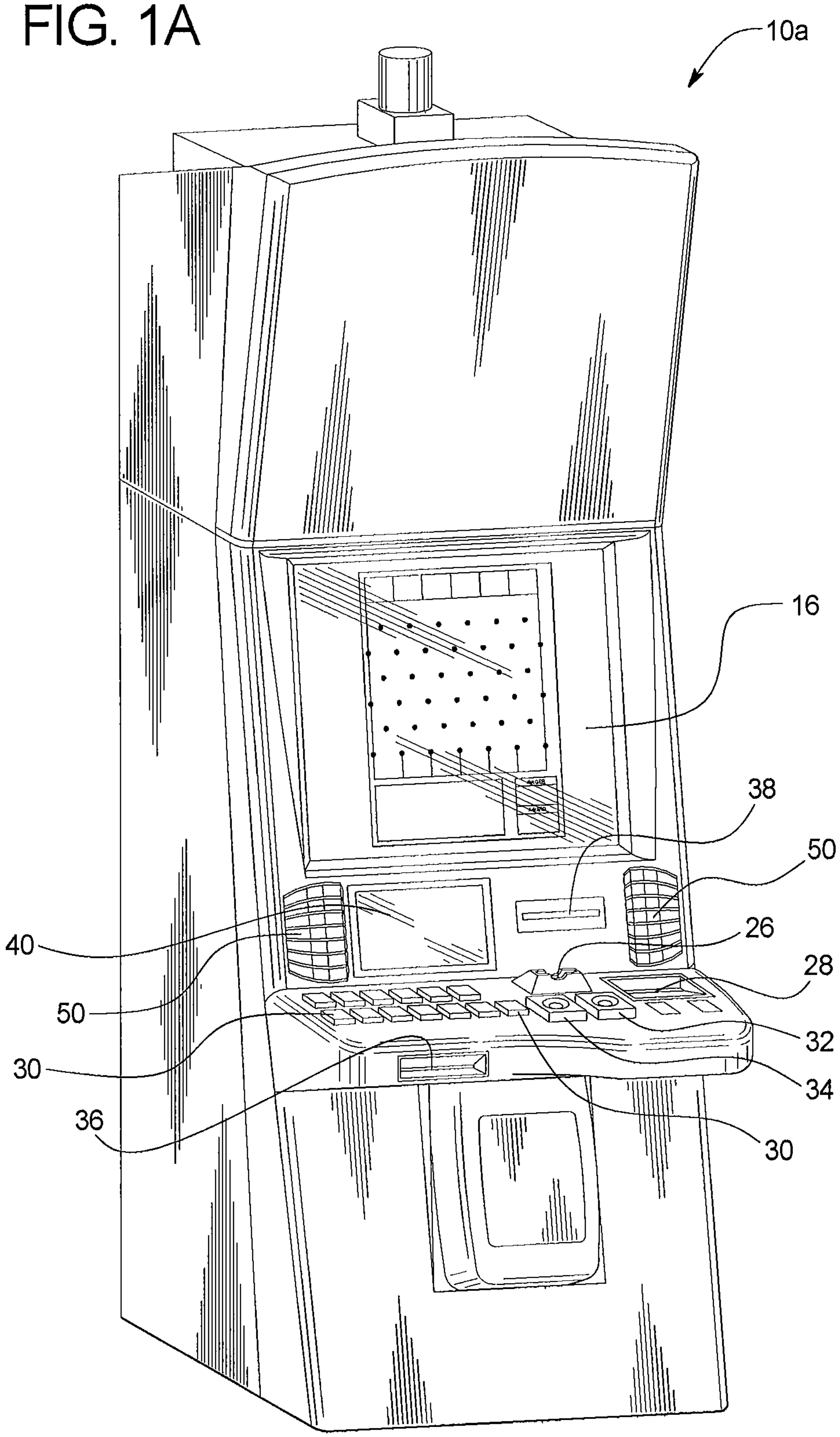
FIGS. 1A and 1B are front perspective views of alternative embodiments of gaming devices disclosed herein.
Figure 1B:
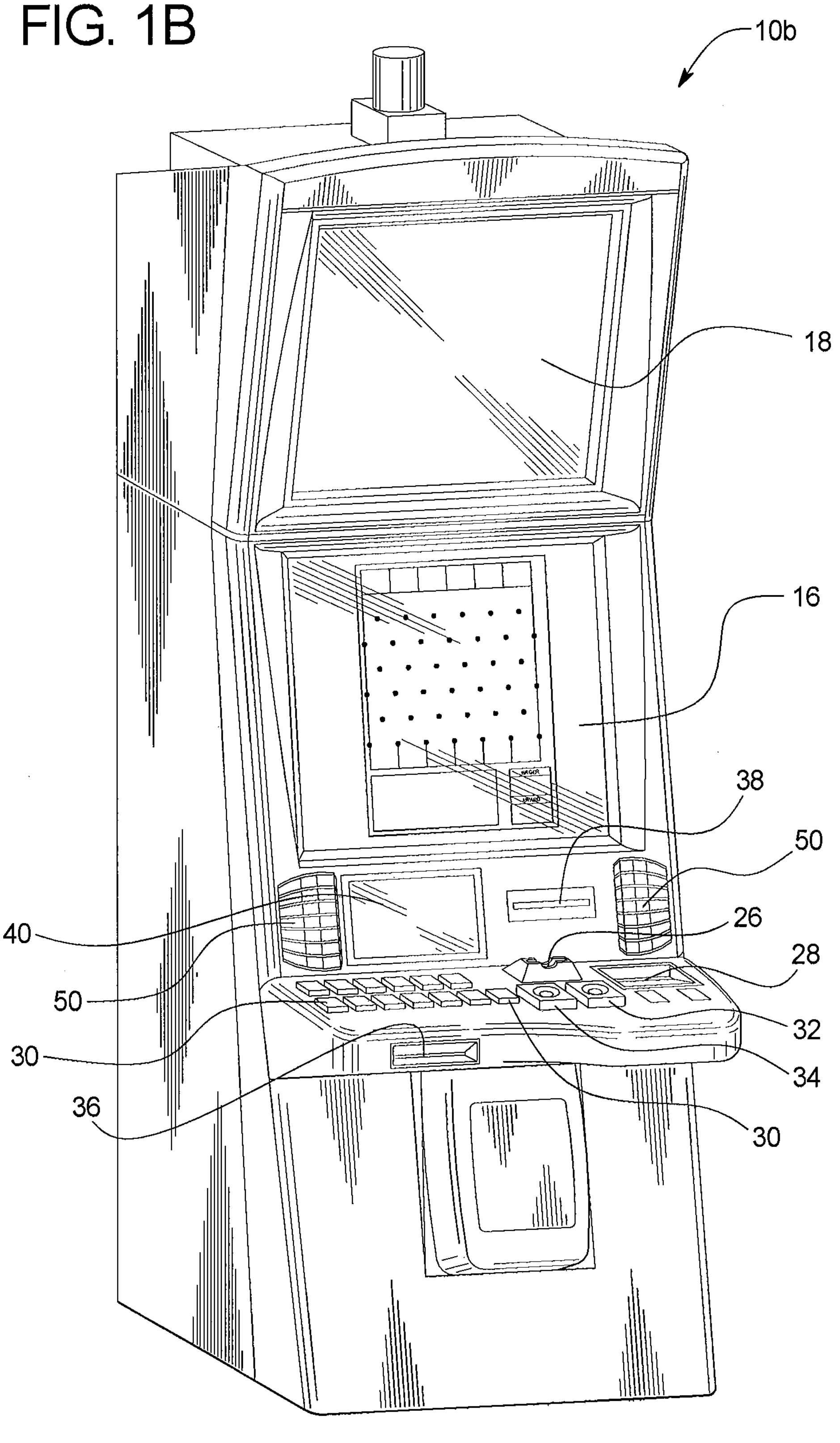

Referring now to the drawings, two example alternative embodiments of a gaming device that implements the falling symbol obstacle board game disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
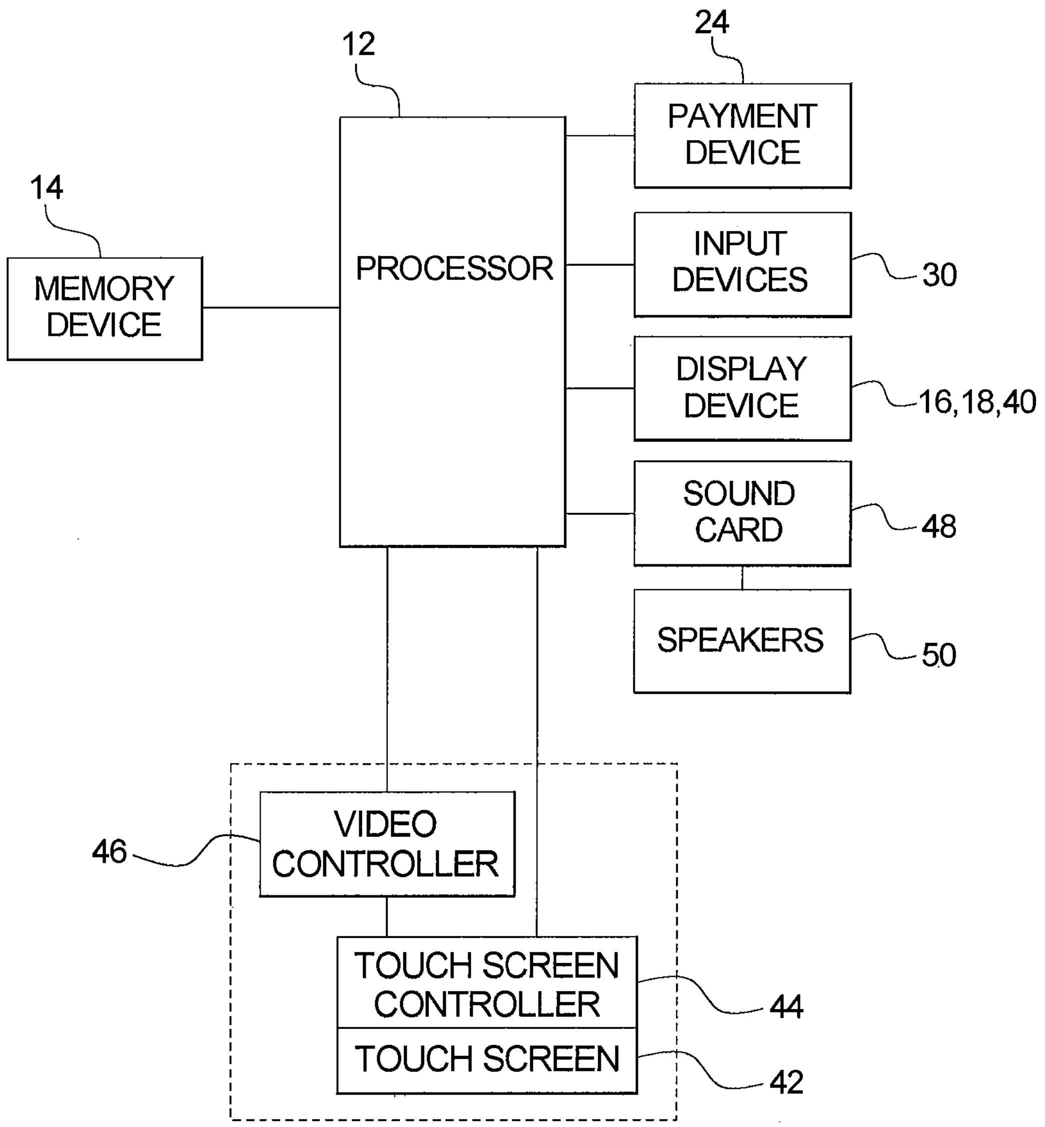
FIG. 2A is a schematic block diagram of an electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays a primary game. In one embodiment, the primary game is the falling symbol obstacle board game. This display device may also display any suitable secondary game associated with the primary game as well as information relating to the primary or secondary game. In another embodiment, the secondary game is the falling symbol obstacle board game. The alternative embodiment shown in FIG. 1B includes a central display device 16 and an upper display device 18. The upper display device may display the primary game, any suitable secondary game associated or not associated with the primary game, and/or information relating to the primary or secondary game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start any primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in, an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the primary and/or secondary game as a game image, symbol, or indicia.

In addition to incorporating the primary game elements of the present disclosure, gaming device 10 may incorporate any suitable secondary wagering game. The secondary wagering game may be incorporated into the primary game or playable independent of the primary game. The gaming machine or device may include some or all of the features of conventional gaming machines or devices. The secondary wagering game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different wagering games, such as video poker games, video blackjack games, video keno, video bingo, or any other suitable game may be implemented.

In one embodiment, the secondary wagering game may be a slot game with one or more paylines. The paylines may be horizontal, vertical, circular, diagonal, angled, or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the secondary wagering game stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are, related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary wagering game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary wagering game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the secondary wagering game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, the primary game may include a triggering event or qualifying condition that gives players the opportunity to win credits in a secondary or bonus game or in a secondary or bonus round. The bonus or secondary game enables the player to obtain a prize or payout in addition to the prize or payout, if any, obtained from the base or primary game. In general, a secondary or bonus game (referred to interchangeably herein) produces a significantly higher level of player excitement than the primary game because it provides a greater expectation of winning than the base or primary game, and is accompanied with more attractive or unusual features than the primary game. In one embodiment, the secondary game may be any type of suitable game, either similar to or completely different from the primary game.

In one embodiment, the triggering event or qualifying condition may be a selected outcome in the primary game or a particular arrangement of one or more indicia on a display device in the primary game. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a bonus or secondary game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program that will automatically begin a bonus round after the player has achieved a triggering event or qualifying condition in the base or primary game. In another embodiment, after a player has qualified for a bonus game, the player may subsequently enhance his/her bonus game participation through continued play on the primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather, the player must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
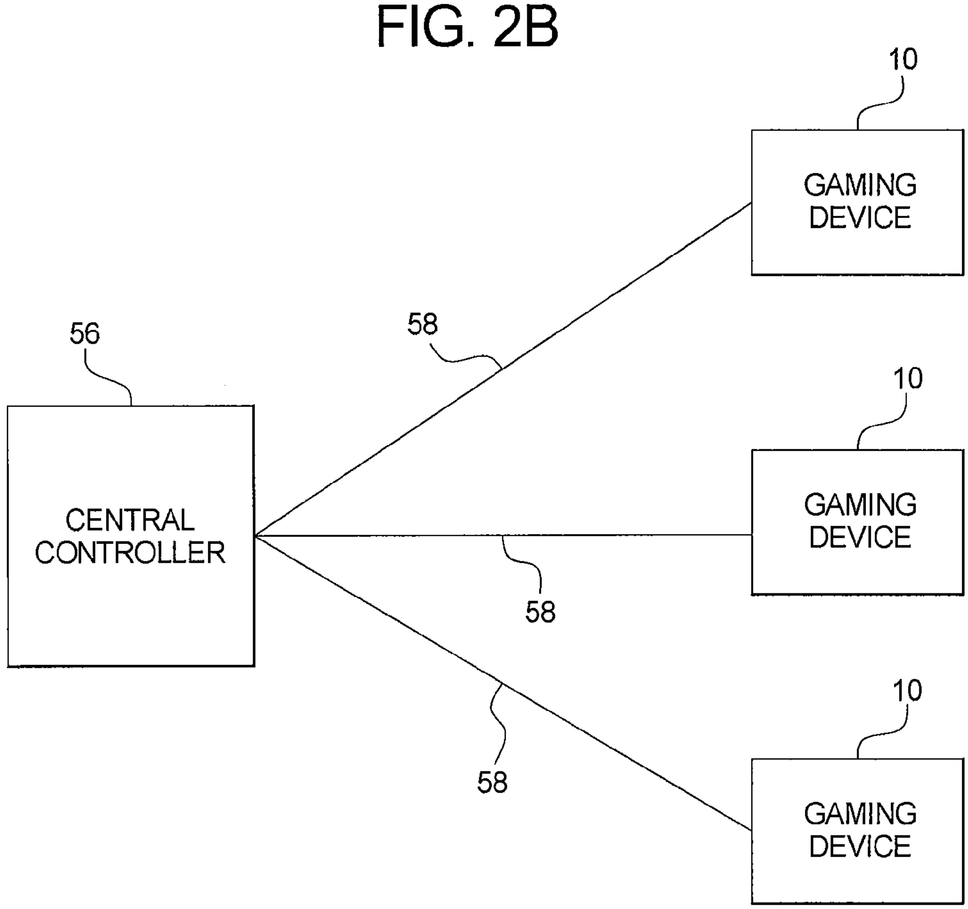
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a ball landing on a designated space in a wheel, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first game, and a second gaming device to have selected elements marked in a different predetermined pattern is provided a second outcome of win $2, which will be provided to a second player regardless of how the second player plays a second game. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for a primary game, a secondary game, or both. In another embodiment, the game program may be executable as a secondary game to be played simultaneous with the play of a primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards.

In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or, alternatively, with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Falling Symbol Obstacle Board Game

Figure 3:
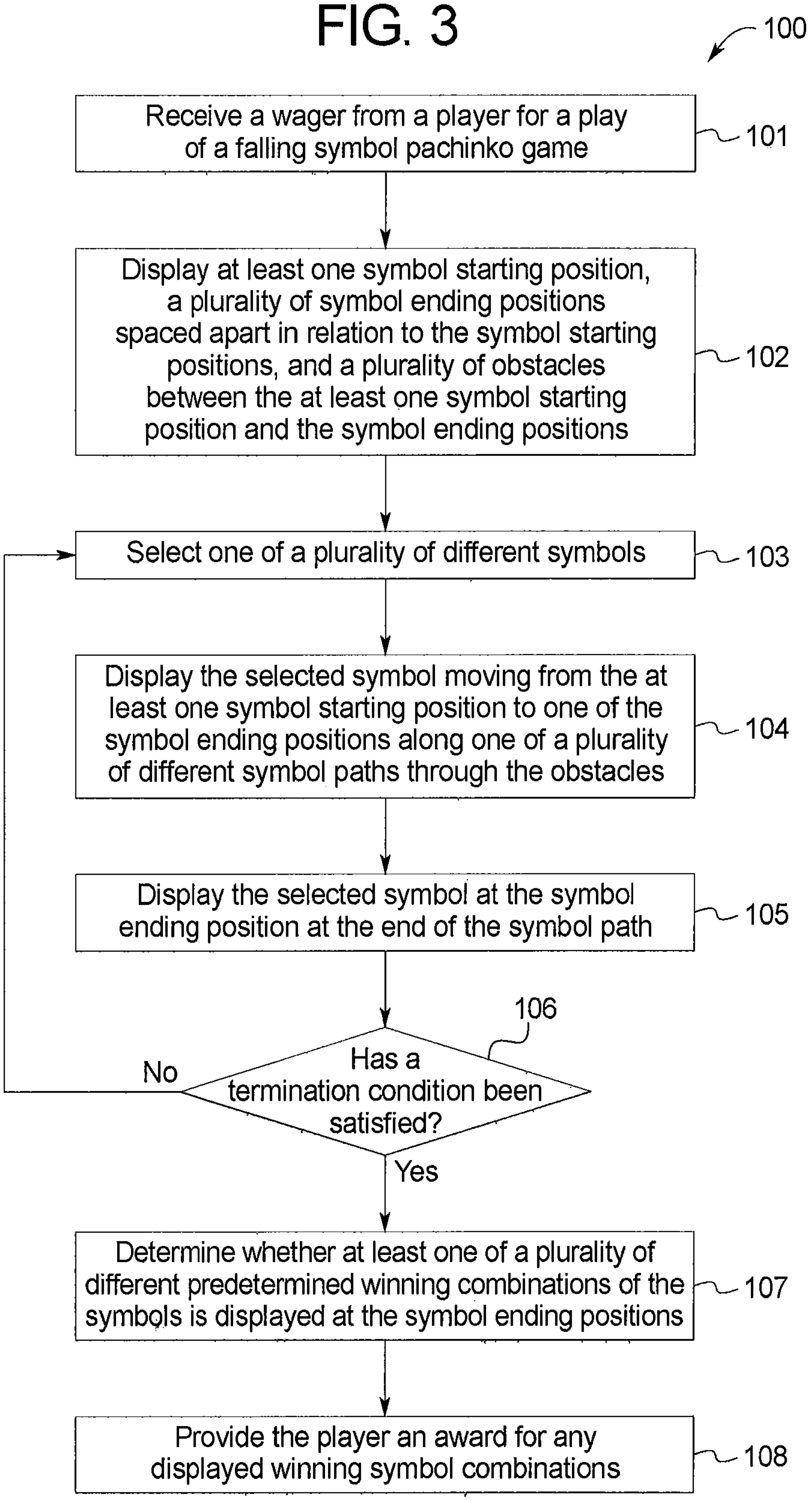
FIG. 3 is a flowchart illustrating one embodiment of a method of operating the gaming system disclosed herein.

FIG. 3 illustrates a flowchart of one example embodiment of a process or method 100 for operating a gaming system or a gaming device configured to operate the falling symbol obstacle board game of the present disclosure. In one embodiment, this process 100 is embodied in one or more software programs stored in one or more memories and executed by one or more processors or controllers. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system receives a wager from a player for a play of the falling symbol obstacle board game, as indicated by block 101. The gaming system displays at least one symbol starting position, a plurality of symbol ending positions spaced apart in relation to the at least one symbol starting position, and a plurality of obstacles between the at least one symbol starting position and the symbol ending positions, as indicated by block 102. The gaming system selects one of a plurality of different symbols, as indicated by block 103. The gaming system displays the selected symbol moving from the at least one symbol starting position into one of the symbol ending positions along one of a plurality of different symbol paths through the obstacles, as indicated by block 104. The gaming system displays the selected symbol at the symbol ending position at the end of the symbol path along which the selected symbol moved, as indicated by block 105. The gaming system determines whether a termination condition has been satisfied, as indicated by diamond 106. If the termination condition has not been satisfied, the gaming system returns to block 103. If the termination condition has been satisfied, the gaming system determines whether at least one of a plurality of different predetermined winning combinations of the symbols is displayed at the symbol ending positions, as indicated by block 107. The gaming system provides the player an award for any displayed winning symbol combinations, as indicated by block 108.

FIGS. 4, 5, 6, 7, 8, 9, 10, and 11 illustrate screen shots of one example embodiment of a gaming system and gaming device configured to operate the falling symbol obstacle board game of the present disclosure. The gaming system includes a display device 110 that displays a falling symbol obstacle board game area 120. Falling symbol obstacle board game area 120 includes a symbol starting area 130, an obstacle area 140 positioned beneath symbol starting area 130, and a symbol ending area 150 positioned beneath obstacle area 140. Symbol starting area 130 includes symbol starting positions 131, 132, 133, 134, 135, and 136. Obstacle area 140 includes obstacles 142*a*, 142*b*, 142*c*, 142*d*, 142*e*, 142*f*, 142*g*, 142*h*, 142*i*, 142*j*, 142*k*, 142*l*, 142*m*, 142*n*, 142*o*, 142*p*, 142*q*, 142*r*, 142*s*, 142*t*, 142*u*, 142*v*, 142*w*, 142*x*, 142*y*, 142*z*, 142*aa*, 142*bb*, 142*cc*, 142*dd*, 142*ee*, 142*ff*, 142*gg*, 142*hh*, 142*ii*, 142*jj*, 142*kk*, 142*ll*, and 142*mm*. Symbol ending area 150 includes symbol ending positions 151, 152, 153, 154, 155, and 156. In this embodiment, obstacles 142*a* to 142*mm* are pegs. Accordingly, in this example embodiment, obstacles 142*a* to 142*mm* are referred to herein as pegs 142*a* to 142*mm* and obstacle area 140 is referred to herein as is peg area 140.

It should be appreciated that the symbol starting area may include any suitable quantity of symbol starting positions, that the obstacle area may include any suitable quantity of obstacles, and that the symbol ending area may include any suitable quantity of symbol ending positions. It should also be appreciated that the symbol starting area may include symbol starting positions that are not uniform in size, that the symbol ending area may include symbol ending positions that are not uniform in size, and that the obstacle area may include obstacles that are not uniform in size. It should further be appreciated that the obstacles may be of any suitable shape. It should be appreciated that any suitable obstacles may be employed.

Each of pegs 142*a* through 142*mm* in peg area 140 is associated with a set of coordinates within peg area 140. Each peg's set of coordinates defines the position at which that peg is displayed within peg area 140. In this embodiment, the coordinates of each of pegs 142*a* through 142*mm* are equidistant from any adjacent pegs. For example, the coordinates of peg 142*j* are equidistant from the coordinates of pegs 142*c*, 142*d*, 142*k*, 142*q*, 142*p*, and 142*i*, which are adjacent to peg 142*j*.

The falling symbol obstacle board game includes a plurality of different symbols. It should be appreciated that any suitable symbols may be employed by the falling symbol obstacle board game. In this embodiment, during a play of the falling symbol obstacle board game the gaming system randomly selects one of the symbols and randomly selects one of symbol starting positions 131, 132, 133, 134, 135, and 136. The gaming system displays the selected symbol at the selected symbol starting position and releases the selected symbol, which falls from the selected symbol starting position into peg area 140.

When the selected symbol falls from the selected symbol starting position, it falls into peg area 140 as if pulled by gravity until it collides with or hits one of pegs 142*a* through 142*mm*. When the selected symbol collides with one of pegs 142*a* to 142*mm* (i.e., when the outer edge of the selected symbol touches or intersects with the outer edge of one of pegs 142A through 142*mm*), the selected symbol changes direction and may or may not change speed. This occurs because pegs 142*a* through 142*mm* are, in this embodiment, displayed as immovable objects. According to the laws of physics, since the pegs do not move when hit by the selected symbol, the selected symbol must change direction, speed, or both. Accordingly, after falling from the selected symbol starting area, the selected symbol travels through peg area 140 and collides with one or more of pegs 142*a* through 142*mm* until it falls into or lands in one of symbol ending positions 151, 152, 153, 154, 155, and 156 in a manner described in detail below.

In this embodiment, the gaming system determines the manner in which the selected symbol falls through peg area 140. In other words, the gaming system determines at least: (a) which of pegs 142*a* through 142*mm* the selected symbol will collide with while falling through peg area 140, (b) which direction the selected symbol will fall after it collides with each of the pegs, and (c) which one of symbol ending positions 151, 152, 153, 154, 155, and 156 in which the selected symbol will land. Put differently, the gaming system determines a symbol path in which the selected symbol: (a) begins at the selected symbol starting position; (b) collides with one of more of pegs 142*a* through 142*mm* while falling through peg area 140, and (c) ends at one of symbol ending positions 151, 152, 153, 154, 155 and 156. After the gaming system determines the symbol path, the display device displays the selected symbol moving from the selected symbol starting position to each of the pegs along the determined symbol path and, ultimately, into the symbol ending position at the end of the determined symbol path.

The gaming system determines the symbol path in one of a plurality of different ways. In certain embodiments, the gaming system stores every possible symbol path associated with each symbol starting position. In other words, for each symbol starting position, the gaming system stores each possible path through the obstacle area along which a symbol may move after being released from that symbol starting position. In one of these embodiments, after selecting a symbol and a symbol starting position, the gaming system determines the symbol path by selecting one of the stored symbol paths associated with the selected symbol starting position. The gaming system then displays the selected symbol moving from the selected symbol starting position along the selected stored symbol path through the obstacle area and into the symbol ending position at the end of the selected stored symbol path. In another one of these embodiments, rather than selecting a symbol starting position, the gaming device selects a symbol and one of the stored symbol paths. The gaming system then displays the selected symbol moving from the symbol starting position at the beginning of the selected stored symbol path along the selected stored symbol path through the obstacle area and into the symbol ending position at the end of the selected stored symbol path. In one of these embodiments in which only one symbol may occupy a symbol ending position, only stored symbol paths that result in a symbol falling into an unoccupied symbol ending position may be selected. Thus, the symbols fall as randomly as possible while ensuring that only one symbol falls into each of the symbol ending positions.

In certain other embodiments, the gaming system determines the symbol path by dynamically generating the symbol path while the selected symbol is falling through the obstacle area. In these embodiments, when the selected symbol collides with an obstacle the gaming system determines the direction in which the selected symbol will fall or travel after colliding with the obstacle. In one of these embodiments, when the selected symbol collides with an obstacle the gaming system randomly determines the direction in which the selected symbol will fall or travel. Thus, in this embodiment, there is an equal likelihood that the selected symbol will fall to the right or to the left of an obstacle after a collision. In another one of these embodiments, when the selected symbol collides with an obstacle the gaming system determines the direction in which the selected symbol will fall or travel based on weighted values. Therefore, in this embodiment, it is more likely that a symbol will fall to either the left or the right after a collision. The weighted values can be determined in any suitable manner, such as, but not limited to, based on game play (such as which symbol ending positions already include symbols), based on a player input, or randomly. In another one of these embodiments, the gaming system uses a physics engine to determine the direction in which the selected symbol will fall or travel after colliding with an obstacle. In this embodiment, the physics engine may take the size and shape of the selected symbol (discussed below) into account when determining the direction in which the selected symbol will travel after colliding with an obstacle.

It should be appreciated that in certain of these embodiments, each symbol's path from the symbol starting area to the symbol ending areas is random. In other words, there could be symbols that stop falling somewhere within the obstacle area and, therefore, do not enter one of the symbol ending areas. In certain of these embodiments already fallen symbols may block or alter the symbol paths of other falling symbols.

It should be appreciated that the gaming system may generate the symbol path along which a selected symbol moves in any suitable manner.

The gaming system repeats the steps of selecting one of the symbols; selecting one of the symbol starting positions; determining a symbol path; displaying the selected symbol moving along the generated symbol path from the selected symbol starting position into one of the symbol ending positions; and displaying the selected symbol at the symbol ending position into which the selected symbol fell at the end of the determined symbol path until a termination condition is satisfied. In this embodiment, the termination condition is satisfied when each of symbol ending positions 151, 152, 153, 154, 155, and 156 displays, includes, or is occupied by (used interchangeably herein for clarity and brevity) one of the symbols. After the termination condition is satisfied, the gaming system determines whether at least one of a plurality of different predetermined winning combinations of the symbols is displayed at the symbol ending positions and provides the player an award for any displayed winning symbol combinations.

Display device 110 also displays a wager display area 112, which is configured to display any wagers placed by the player; an award display area 114, which is configured to display any awards won by the player; and an indication or dialog box 118, which displays instructions, notifications, or comments related to the falling symbol obstacle board game during, before, and/or after play of the falling symbol obstacle board game. It should be appreciated that, in certain embodiments, the display device displays none or a plurality of the wager indicator, the award indicator, and the indication box.

Figure 4:
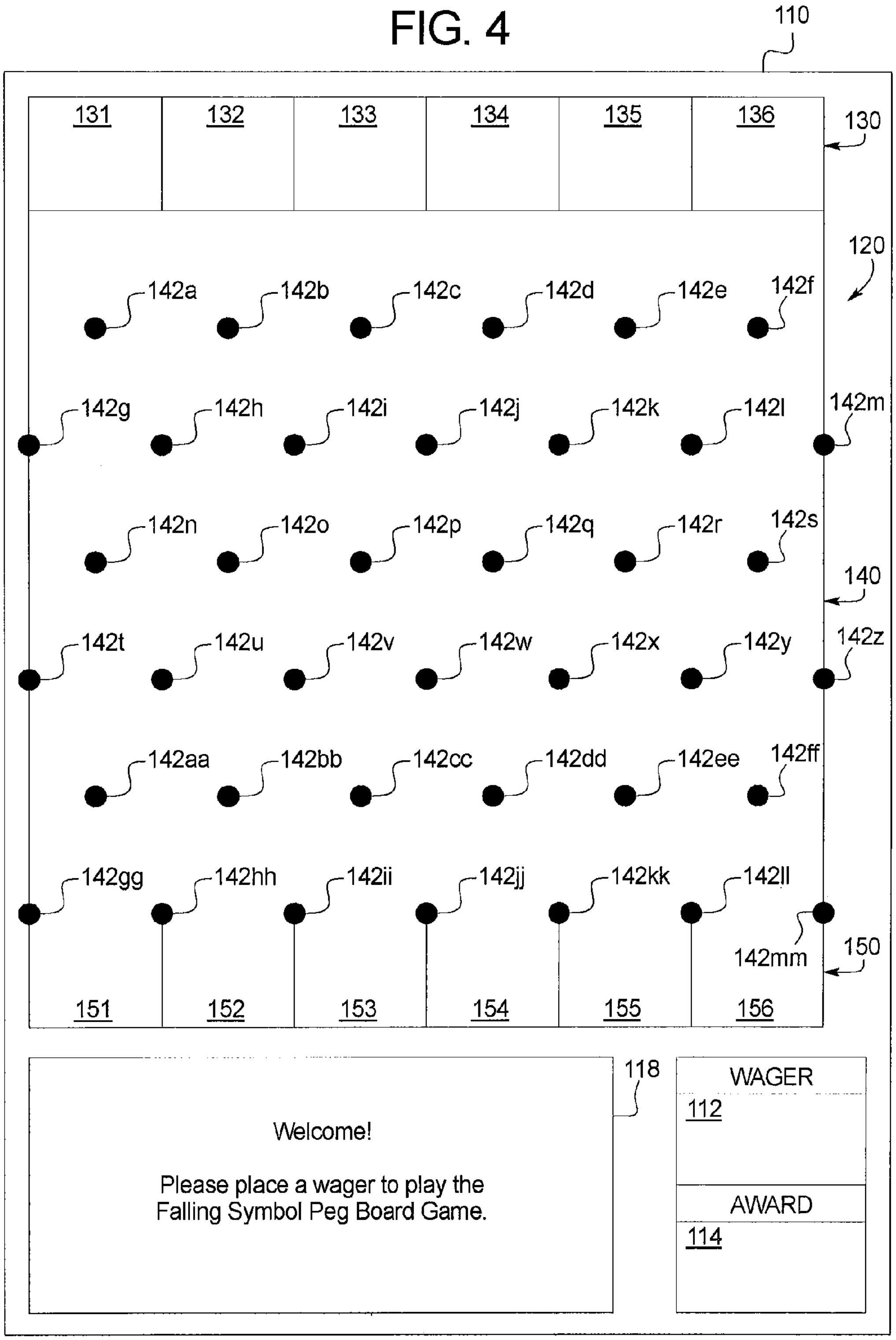
FIG. 4 is a front elevational view of a screen shot of a display device of one embodiment of the gaming system of the present disclosure including a welcome or attract screen.

As illustrated in FIG. 4, when the gaming system is not being played by a player, display device 110 displays an attract screen that includes a welcome message in indication box 118. The welcome message invites a player to place a wager to play the falling symbol obstacle board game.

Figure 5:
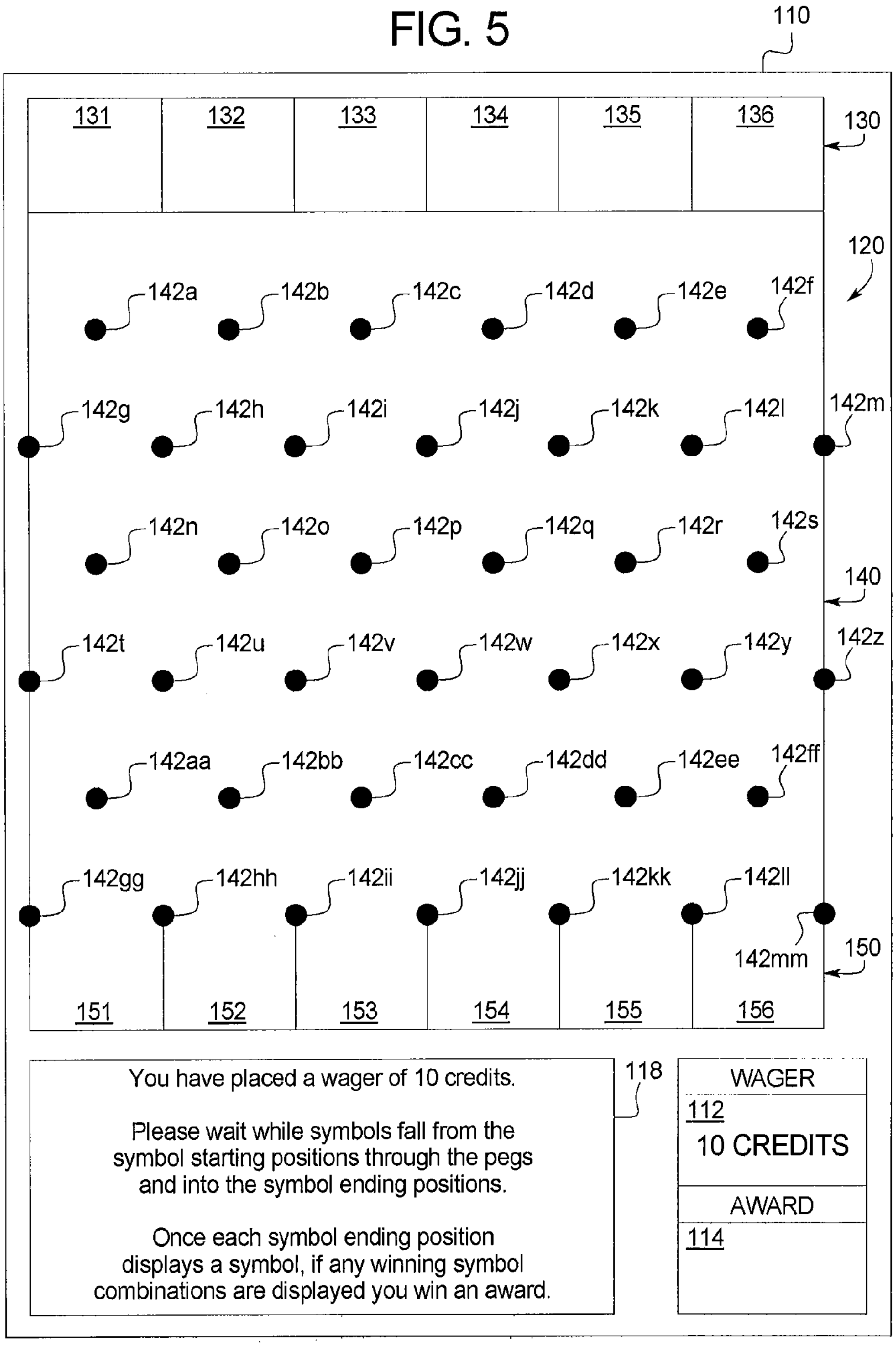
FIG. 5 is a front elevational view of a screen shot of the display device of FIG. 4 including a notification to a player that the player has placed a wager, that symbols will fall through the obstacles, such as pegs, and into symbol ending positions, and that the gaming system will determine whether the player wins an award after each symbol ending position displays a symbol.

As illustrated in FIG. 5, the player has placed a wager of 10 credits on the falling symbol obstacle board game. Wager display area 112 displays this wager. As illustrated in indication box 118, the gaming system instructs the player to wait while the gaming system selects symbols that will fall from symbol starting positions 131, 132, 133, 134, 135, and 136 through peg area 140 and into symbol ending positions 151, 152, 153, 154, 155, and 156. The gaming system also notifies the player that once each of the symbol ending positions displays, includes, or is occupied by one of the symbols, the gaming system will determine whether any winning combinations of the symbols are displayed at the symbol ending positions and, if so, that the player will win an award associated with any displayed winning symbol combinations.

As illustrated in FIGS. 6, 7, 8, 9, 10, and 11 (described below), in this embodiment each of the selected symbols is displayed as being encased within a circle. The outer edge of the circle interacts with (i.e., collides with) the outer edges of the pegs (referred to herein as colliding with the pegs for clarity and brevity) in the manner described above as the selected symbol falls along the determined symbol path through the peg area and into one of the symbol ending positions. It should be appreciated that the combination of the symbol and the shape within which the symbol is encased is referred to herein as the "symbol" for clarity and brevity.

In other embodiments, each of the selected symbols is displayed as being encased within a shape including, but not limited to, a circle, an oval, an ellipsis, a square, a rectangle, a pentagon, a hexagon, or an octagon. In certain of these embodiments, the shapes are substantially flat such that the shapes resemble pucks or disks. In other of these embodiments, the shapes are three-dimensional solids such as, but not limited to, spheres, half spheres, or any other suitable three-dimensional solid shape. In certain of these embodiments, each of the selected symbols is displayed as being encased within the same shape. In other of these embodiments, at least two of the selected symbols are displayed as being encased within different shapes. In a further embodiment, each of the selected symbols is displayed as being encased within a different shape. It should be appreciated that, as described above with respect to the embodiment of the gaming system employing the physics engine, the different shapes may affect the manner in which the selected symbols fall through the obstacle area and interact with the obstacles and, in certain embodiments, with one another. For example, when the outer edge of a circle that encases a selected symbol collides with one of the obstacles, the result of the collision (e.g., the direction in which the selected symbol travels, the speed at which the selected symbol travels, the rate of spin (if any) of the selected symbol) may be different than when the outer edge of a triangle that encases a selected symbol collides with one of the obstacles. In another embodiment, the selected symbols are not encased within a shape. In this embodiment, the outer edges of the selected symbols collide with and interact with the obstacles in generally the same manner as the outer edges of the shapes that may encase the selected symbols.

While in this embodiment the circles encasing each of the symbols are each the same or about the same size. It should be appreciated that, in other embodiments, the shapes encasing the symbols may vary in size. Similarly, the symbols themselves may vary in size in certain embodiments.

Figure 6:
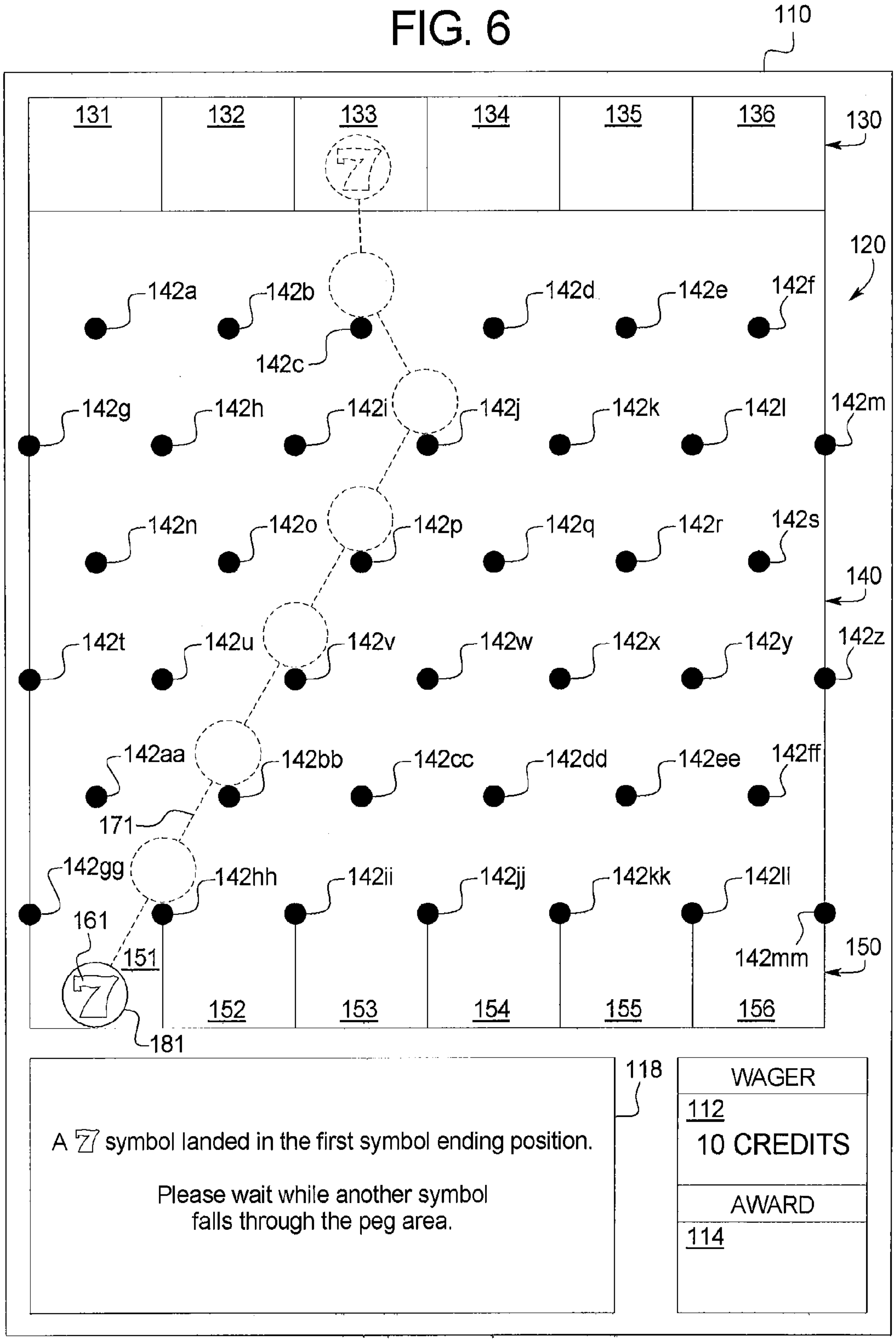
FIG. 6 is a front elevational view of a screen shot of the display device of FIG. 4 including a notification to the player that a "7" symbol landed in the first symbol ending position and that another symbol will fall through the peg area.

As illustrated in FIG. 6, the gaming system randomly selects symbol “7” 161 (encased within circle 181) and symbol starting position 133, and displays symbol “7” 161 at symbol starting position 133. The gaming system determines a symbol path 171 along which symbol “7” 161 will fall in one of the manners described above. The gaming system displays symbol “7” 161 falling through peg area 140 along determined symbol path 171 as follows: symbol “7” 161 falls from symbol starting position 133 and collides with peg 142*c*, symbol “7” 161 falls to the right of peg 142*c* and collides with peg 142*j*, symbol “7” 161 falls to the left of peg 142*j* and collides with peg 142*p*, symbol “7” 161 falls to the left of peg 142*p* and collides with peg 142*v*, symbol “7” 161 falls to the left of peg 142*v* and collides with peg 142*bb*, symbol “7” 161 falls to the left of peg 142*bb* and collides with peg 142*hh*, symbol “7” 161 falls to the left of peg 142*hh* into symbol ending position 151. Indication box 118 displays a notification that symbol “7” 161 landed in symbol ending position 151. Since each of the symbol ending positions do not display one of the symbols (i.e., since the termination condition has not been satisfied), indication box 118 also displays a notification that another symbol will fall from one of the symbol starting positions through the peg area into one of the symbol ending positions.

It should be appreciated that the gaming system may select the symbols that will fall from the symbol starting positions in any suitable manner. In one embodiment wherein the falling symbol obstacle board game is a secondary or bonus game associated with a primary or base game, the gaming system selects the symbols that will fall from the symbol starting positions based on one or more outcomes of the primary or base game. In another embodiment, the gaming system enables the player to select at least one of the symbols that will fall from the symbol starting positions. In one embodiment, the gaming system selects the symbols that will fall from the symbol starting positions in a predetermined order.

It should also be appreciated that the gaming system may select the symbol starting position from which a selected symbol will fall in any suitable manner. In one embodiment, the gaming system enables the player to select the symbol starting position from which the selected symbol will fall. In another embodiment, the gaming system selects the symbol starting position from which the selected symbol will fall based on a predetermined order. For example, the gaming system may cause the first selected symbol to fall from the leftmost symbol starting position, the second selected symbol to fall from the symbol starting position directly to the right of the leftmost symbol starting position, and so on. In another embodiment wherein the falling symbol obstacle board game is a secondary or bonus game associated with a primary or base game, the gaming system selects the symbol starting position from which the selected symbol will fall based on one or more outcomes of the primary or base game.

In this embodiment, once one of the selected symbols has landed in (i.e., is displayed at) one of the symbol ending positions, that symbol remains displayed at that symbol ending position for the duration of the play of the falling symbol obstacle board game. In other words, for each symbol ending position, the first selected symbol to occupy (i.e., be displayed at) that symbol ending position will not be removed from that symbol ending position. When one of the selected symbols lands in a symbol ending position that is already occupied by another one of the selected symbols, the later-landing selected symbol is removed from play. The earlier-landing selected symbol remains displayed at the symbol ending position.

Figure 7:
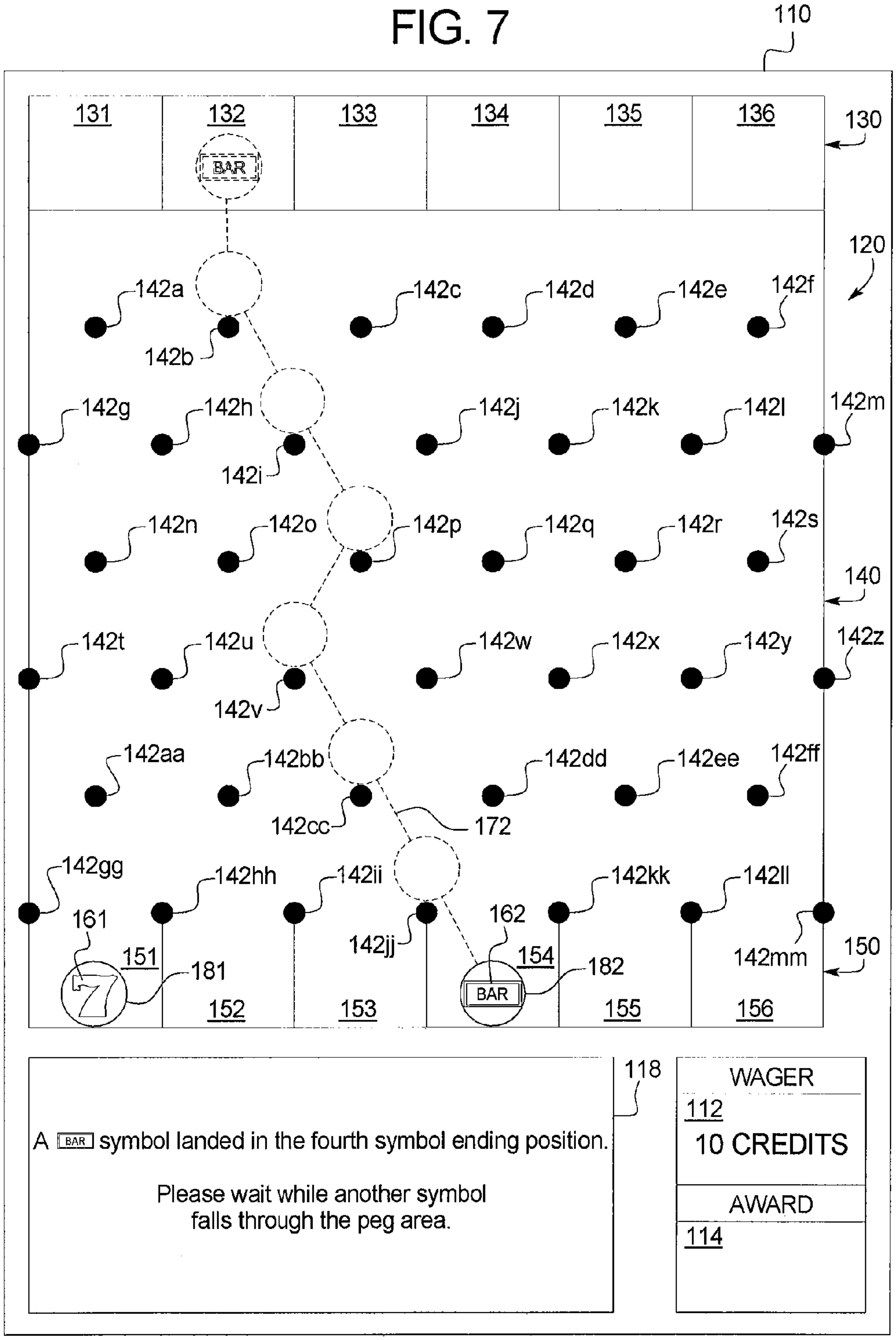
FIG. 7 is a front elevational view of a screen shot of the display device of FIG. 4 including a notification to the player that a "BAR" symbol landed in the fourth symbol ending position and that another symbol will fall through the peg area.

As illustrated in FIG. 7, the gaming system randomly selects symbol “BAR” 162 (encased within circle 182) and symbol starting position 132, and displays symbol “BAR” 162 at symbol starting position 132. The gaming system determines a symbol path 172 along which symbol “BAR” 162 will fall in one of the manners described above. The gaming system displays symbol “BAR” 162 falling through peg area 140 along determined symbol path 172 as follows: symbol “BAR” 162 falls from symbol starting position 132 and collides with peg 142*b*, symbol “BAR” 162 falls to the right of peg 142*b* and collides with peg 142*i*, symbol “BAR” 162 falls to the right of peg 142*i* and collides with peg 142*p*, symbol “BAR” 162 falls to the left of peg 142*p* and collides with peg 142*v*, symbol “BAR” 162 falls to the right of peg 142*v* and collides with peg 142*cc*, symbol “BAR” 162 falls to the right of peg 142*cc* and collides with peg 142*jj*, symbol “BAR” 162 falls to the right of peg 142*jj* into symbol ending position 154. Indication box 118 displays a notification that symbol “BAR” 162 landed in symbol ending position 154. Since the each of the symbol ending positions do not display one of the symbols (i.e., since the termination condition has not been satisfied), indication box 118 also displays a notification that another symbol will fall from one of the symbol starting positions through the peg area into one of the symbol ending positions.

Figure 8:
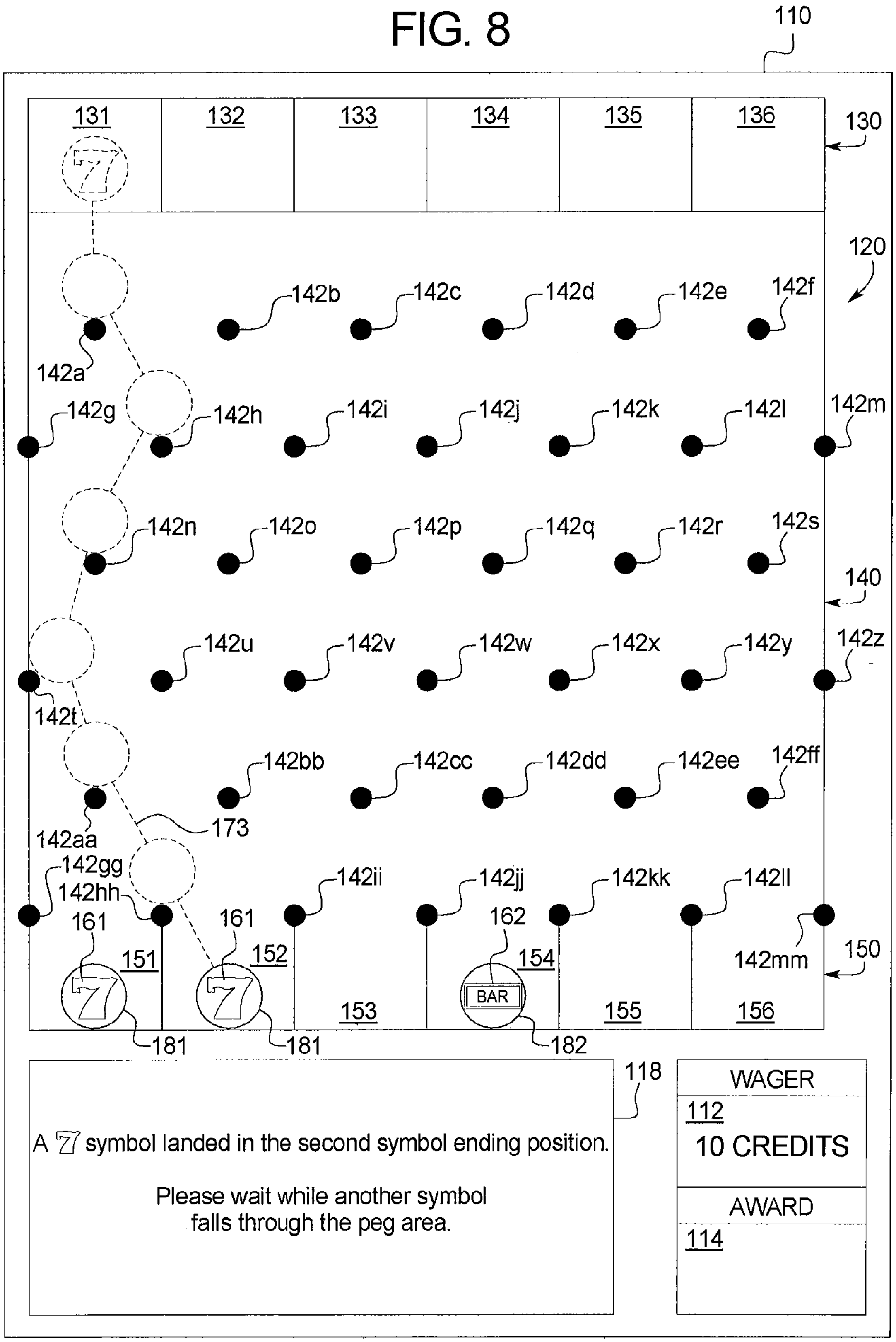
FIG. 8 is a front elevational view of a screen shot of the display device of FIG. 4 including a notification to the player that the "7" symbol landed in the second symbol ending position and that another symbol will fall through the peg area.

As illustrated in FIG. 8, the gaming system randomly selects symbol “7” 161 (encased within circle 181) and symbol starting position 131, and displays symbol “7” 161 at symbol starting position 131. The gaming system determines a symbol path 173 along which the symbol “7” 161 will fall in one of the manners described above. The gaming system displays symbol “7” 161 falling through peg area 140 along determined symbol path 173 as follows: symbol “7” 161 falls from symbol starting position 131 and collides with peg 142*a*, symbol “7” 161 falls to the right of peg 142*a* and collides with peg 142*h*, symbol “7” 161 falls to the left of peg 142*h* and collides with peg 142*n*, symbol “7” 161 falls to the left of peg 142*n* and collides with peg 142*t*, symbol “7” 161 falls to the right of peg 142*t* and collides with peg 142*aa*, symbol “7” 161 falls to the right of peg 142*aa* and collides with peg 142*hh*, symbol “7” 161 falls to the right of peg 142*hh* into symbol ending position 152. Indication box 118 displays a notification that symbol “7” 161 landed in symbol ending position 152. Since the each of the symbol ending positions do not display one of the symbols (i.e., since the termination condition has not been satisfied), indication box 118 also displays a notification that another symbol will fall from one of the symbol starting positions through the peg area into one of the symbol ending positions.

Figure 9:
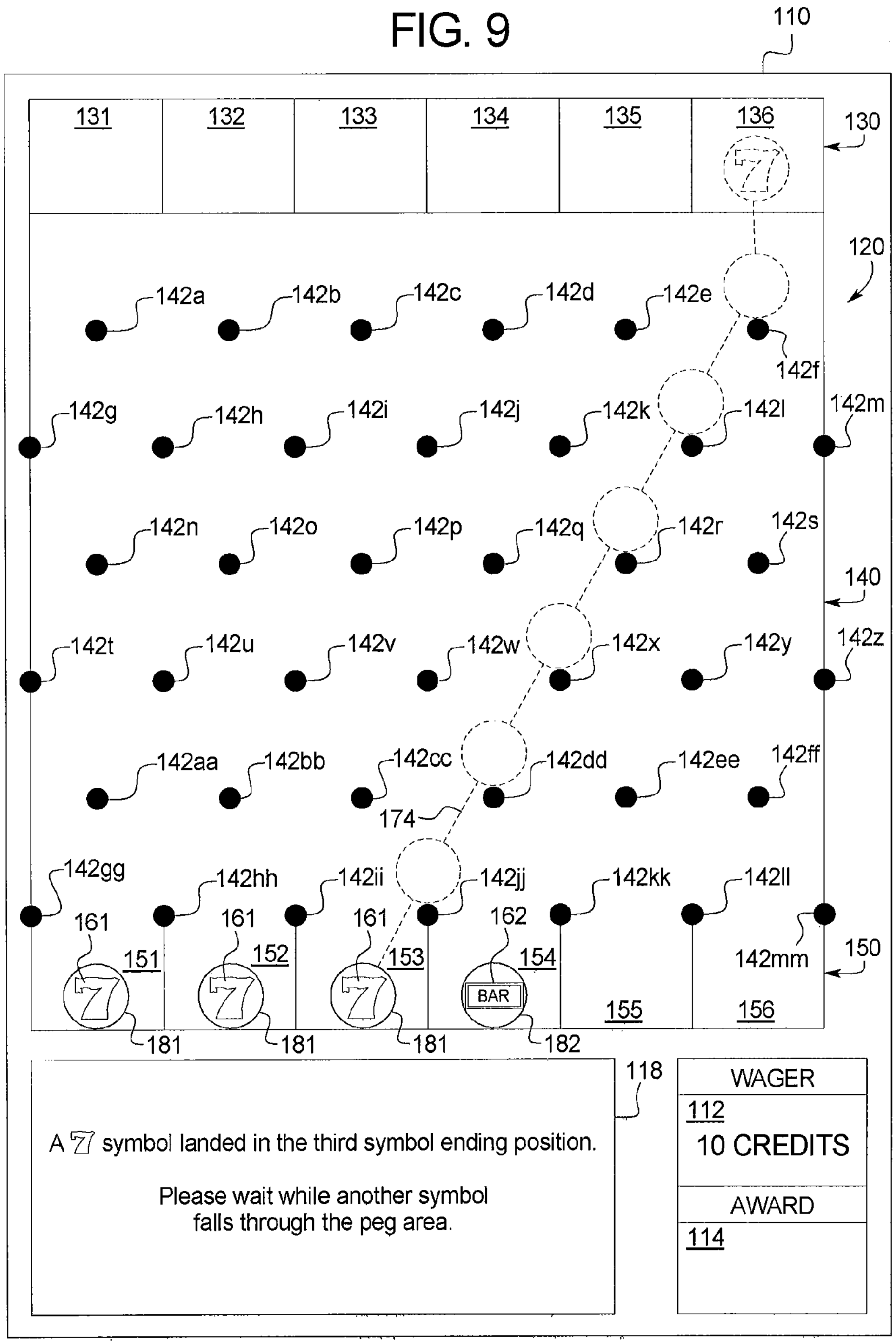
FIG. 9 is a front elevational view of a screen shot of the display device of FIG. 4 including a notification to the player that the "7" symbol landed in the third symbol ending position and that another symbol will fall through the peg area.

As illustrated in FIG. 9, the gaming system randomly selects symbol “7” 161 (encased within circle 181) and symbol starting position 136, and displays symbol “7” 161 at symbol starting position 136. The gaming system determines a symbol path 174 along which symbol “7” 161 will fall in one of the manners described above. The gaming system displays symbol “7” 161 falling through peg area 140 along determined symbol path 174 as follows: symbol “7” 161 falls from symbol starting position 136 and collides with peg 142*f*, symbol "7" 161 falls to the left of peg 142*f* and collides with peg 142*l*, symbol "7" 161 falls to the left of peg 142*l* and collides with peg 142*r*, symbol "7" 161 falls to the left of peg 142*r* and collides with peg 142*x*, the symbol "7" 161 falls to the left of peg 142*x* and collides with peg 142*dd*, symbol "7" 161 falls to the left of peg 142*dd* and collides with peg 142*jj*, symbol "7" 161 falls to the left of peg 142*jj* into symbol ending position 153. Indication box 118 displays a notification that symbol "7" 161 landed in symbol ending position 153. Since the each of the symbol ending positions do not display one of the symbols (i.e., since the termination condition has not been satisfied), indication box 118 also displays a notification that another symbol will fall from one of the symbol starting positions through the peg area into one of the symbol ending positions.

Figure 10:
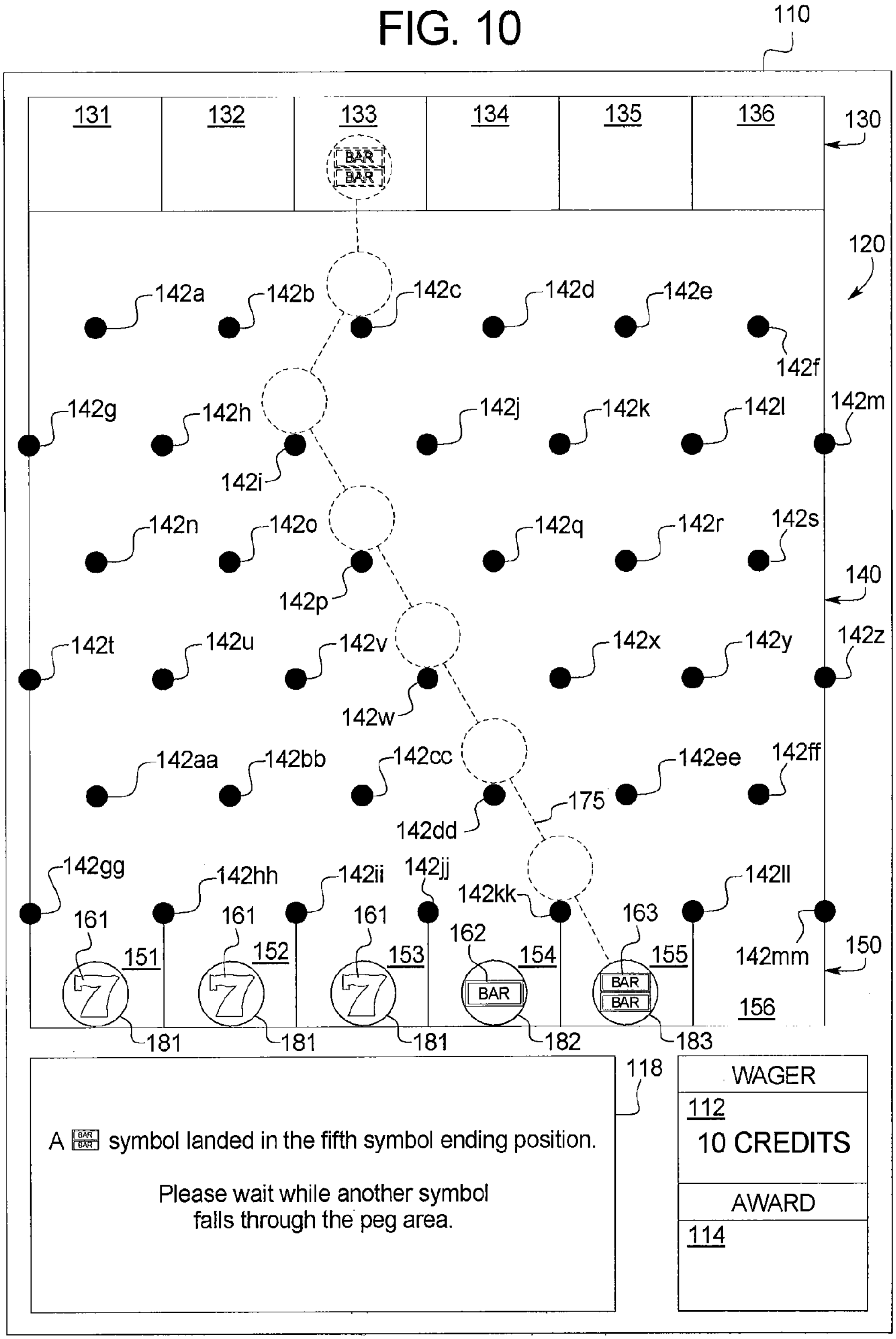
FIG. 10 is a front elevational view of a screen shot of the display device of FIG. 4 including a notification to the player that a "DOUBLE BAR" symbol landed in the fifth symbol ending position and that another symbol will fall through the peg area.

As illustrated in FIG. 10, the gaming system randomly selects symbol "DOUBLE BAR" 163 (encased within circle 183) and symbol starting position 133, and displays symbol "DOUBLE BAR" 163 at symbol starting position 133. The gaming system determines a symbol path 175 along which symbol "DOUBLE BAR" 163 will fall in one of the manners described above. The gaming system displays symbol "DOUBLE BAR" 163 falling through peg area 140 along determined symbol path 175 as follows: symbol "DOUBLE BAR" 163 falls from symbol starting position 133 and collides with peg 142*c*, symbol "DOUBLE BAR" 163 falls to the left of peg 142*c* and collides with peg 142*i*, symbol "DOUBLE BAR" 163 falls to the right of peg 142*i* and collides with peg 142*p*, symbol "DOUBLE BAR" 163 falls to the right of peg 142*p* and collides with peg 142*w*, symbol "DOUBLE BAR" 163 falls to the right of peg 142*w* and collides with peg 142*dd*, symbol "DOUBLE BAR" 163 falls to the right of peg 142*dd* and collides with peg 142*kk*, symbol "DOUBLE BAR" 163 falls to the right of peg 142*kk* into symbol ending position 155. Indication box 118 displays a notification that symbol "DOUBLE BAR" 163 landed in symbol ending position 155. Since the each of the symbol ending positions do not display one of the symbols (i.e., since the termination condition has not been satisfied), indication box 118 also displays a notification that another symbol will fall from one of the symbol starting positions through the peg area into one of the symbol ending positions.

Figure 11:
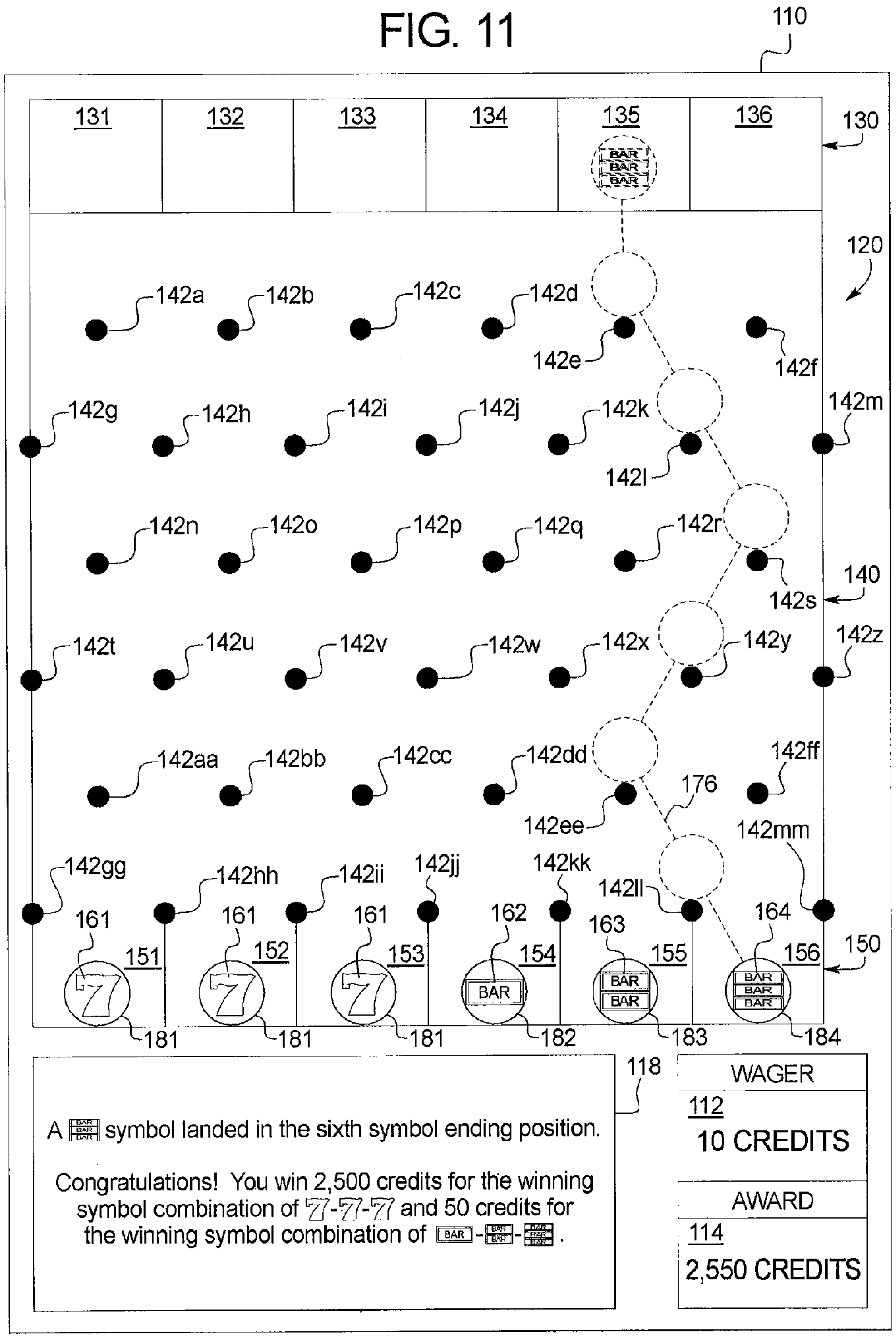
FIG. 11 is a front elevational view of a screen shot of the display device of FIG. 4 including a notification to the player that a "TRIPLE BAR" symbol landed in the sixth symbol ending position and that the player wins an award of 200 credits.

As illustrated in FIG. 11, the gaming system randomly selects symbol "TRIPLE BAR" 164 (encased within circle 164) and symbol starting position 135, and displays symbol "TRIPLE BAR" 164 at symbol starting position 135. The gaming system determines a symbol path 176 along which symbol "TRIPLE BAR" 164 will fall in one of the manners described above. The gaming system displays symbol "TRIPLE BAR" 164 falling through peg area 140 along determined symbol path 176 as follows: symbol "TRIPLE BAR" 164 falls from symbol starting position 135 and collides with peg 142*e*, symbol "TRIPLE BAR" 164 falls to the right of peg 142*e* and collides with peg 142*l*, symbol "TRIPLE BAR" 164 falls to the right of peg 142*l* and collides with peg 142*s*, symbol "TRIPLE BAR" 164 falls to the left of peg 142*s* and collides with peg 142*y*, symbol "TRIPLE BAR" 164 falls to the left of peg 142*y* and collides with peg 142*ee*, symbol "TRIPLE BAR" 164 falls to the right of peg 142*ee* and collides with peg 142*ll*, symbol "TRIPLE BAR" 164 falls to the right of peg 142*ll* into symbol ending position 156. Indication box 118 displays a notification that symbol "TRIPLE BAR" 164 landed in symbol ending position 156.

Since each of symbol ending positions 151, 152, 153, 154, 155, and 156 displays one of the symbols (i.e., since the termination condition has been satisfied), gaming system determines whether any of the different predetermined winning combinations of the symbols are displayed at symbol ending positions 151, 152, 153, 154, 155, and 156. One of the winning combinations of the predetermined symbols is "7"-"7"-"7." Since symbol ending positions 151, 152, and 153 display the symbol combination "7"-"7"-"7," the player wins an award of 2500 credits. Another of the predetermined winning combinations of the symbols is "BAR"-"DOUBLE BAR"-"TRIPLE BAR." Since symbol ending positions 154, 155, and 156 display the symbol combination "BAR"-"DOUBLE BAR"-"TRIPLE BAR," the player wins an award of 50 credits. Indication box 118 displays a notification that the player has won these awards. Award display area 114 displays the total award of 200 credits. The gaming system provides the player with 200 credits.

It should be appreciated that the gaming system is configured to display a plurality of selected symbols falling at once. The gaming system does not have to wait for one of the selected symbols to land in one of the symbol ending positions before selecting and releasing another one of the symbols into the obstacle area.

It should be appreciated that any suitable termination condition may be employed. In certain embodiments, the termination condition is satisfied when a designated quantity of symbols have been selected and released into the obstacle area. In one of these embodiments, an empty symbol ending position is skipped during the award determination. In another of these embodiments, only continuous symbols in the symbol ending positions are evaluated for award determination purposes. In another embodiment, the termination condition is satisfied when a designated quantity of the symbol ending positions are occupied by one of the symbols. In another embodiment, the termination condition is satisfied when a designated time period expires. In another embodiment, the termination condition is satisfied when a termination symbol is selected and falls into one of the symbol ending positions. In another embodiment, the termination condition is satisfied when one of the symbols lands in a designated one of the symbol ending positions.

In certain other embodiments, once one of the symbols has landed in one of the symbol ending positions, that symbol may be replaced by a later-falling symbol. In one of these embodiments, if a symbol lands in a symbol ending position in which another symbol has already landed (i.e., another symbol already occupies that symbol ending position), the first symbol to occupy that symbol ending position is removed from that symbol ending position and replaced with the later-landing symbol. In another embodiment, the symbol ending positions are configured to receive and display multiple symbols. In this embodiment, when a symbol falls into a symbol ending position that is already occupied by another symbol, both symbols occupy the symbol ending position.

In certain embodiments, the plurality of symbols includes a WILD symbol. In one of these embodiments, after the WILD symbol lands in one of the symbol ending positions and after the termination condition has been satisfied, during the award determination the WILD symbol takes the form of the symbol that would provide the player with the greatest possible award. In other embodiments, a winning outcome that includes the WILD symbol causes the award associated with that outcome to be increased above the award associated with an equivalent outcome that does not include the WILD symbol. In one of these embodiments, the inclusion of the WILD symbol in a winning symbol combination increases the award value associated with the winning symbol combination by a predetermined multiplier value. In another one of these embodiments, the inclusion of the WILD symbol in a winning symbol combination increases the award value associated with the winning symbol combination by a variable multiplier value. In one embodiment, the variable multiplier value is determined by an outcome of a secondary or bonus game or in any other suitable manner. In certain embodiments, the inclusion of two or more WILD symbols in a winning symbol combination increases the award value associated with the winning symbol combination by a larger amount that an equivalent outcome that includes a lesser quantity of WILD symbols. In another embodiment, if the WILD symbol lands in a symbol ending position already occupied by another symbol, the WILD symbol replaces that symbol. In another embodiment, the WILD symbol is not affected by any, a plurality of, or at least one of the obstacles while it falls through the obstacle area. In other words, in this embodiment the obstacles do not affect the WILD symbol's path through the obstacle area. In another embodiment, when the WILD symbol collides with another symbol, the gaming system changes the shape and/or the size of the other symbol. In some embodiments, the WILD symbol is sized to fit into certain symbol ending positions and to not fit into certain symbol ending positions. In other embodiments, the WILD symbol is sized to fit between certain obstacles and sized not to fit between certain obstacles.

In certain other embodiments, the plurality of symbols includes a BONUS symbol. In one of these embodiments, the BONUS symbol acts in the same manner as the WILD symbol (discussed above) and also provides the player with one or more free plays of the falling symbol obstacle board game or a secondary or bonus game. The secondary or bonus game may be any suitable game. In another embodiment, when the BONUS, symbol lands in one of the symbol ending positions, any awards associated with that symbol ending position (i.e., associated with the BONUS symbol that landed in that symbol ending position) are modified in some manner. In one of these embodiments, the modification is an increase of any award, such as by a multiplier. In an embodiment of the falling symbol obstacle board game including paylines, such as the embodiment discussed below with respect to FIG. 18, any awards associated with any paylines that pass through (i.e., are associated with) the symbol ending position displaying the BONUS symbol are modified in some manner, such as by a multiplier. In some embodiments, the BONUS symbol is sized to fit into certain symbol ending positions and to not fit into certain symbol ending positions. In other embodiments, the BONUS symbol is sized to fit between certain obstacles and sized not to fit between certain obstacles.

Figure 12:
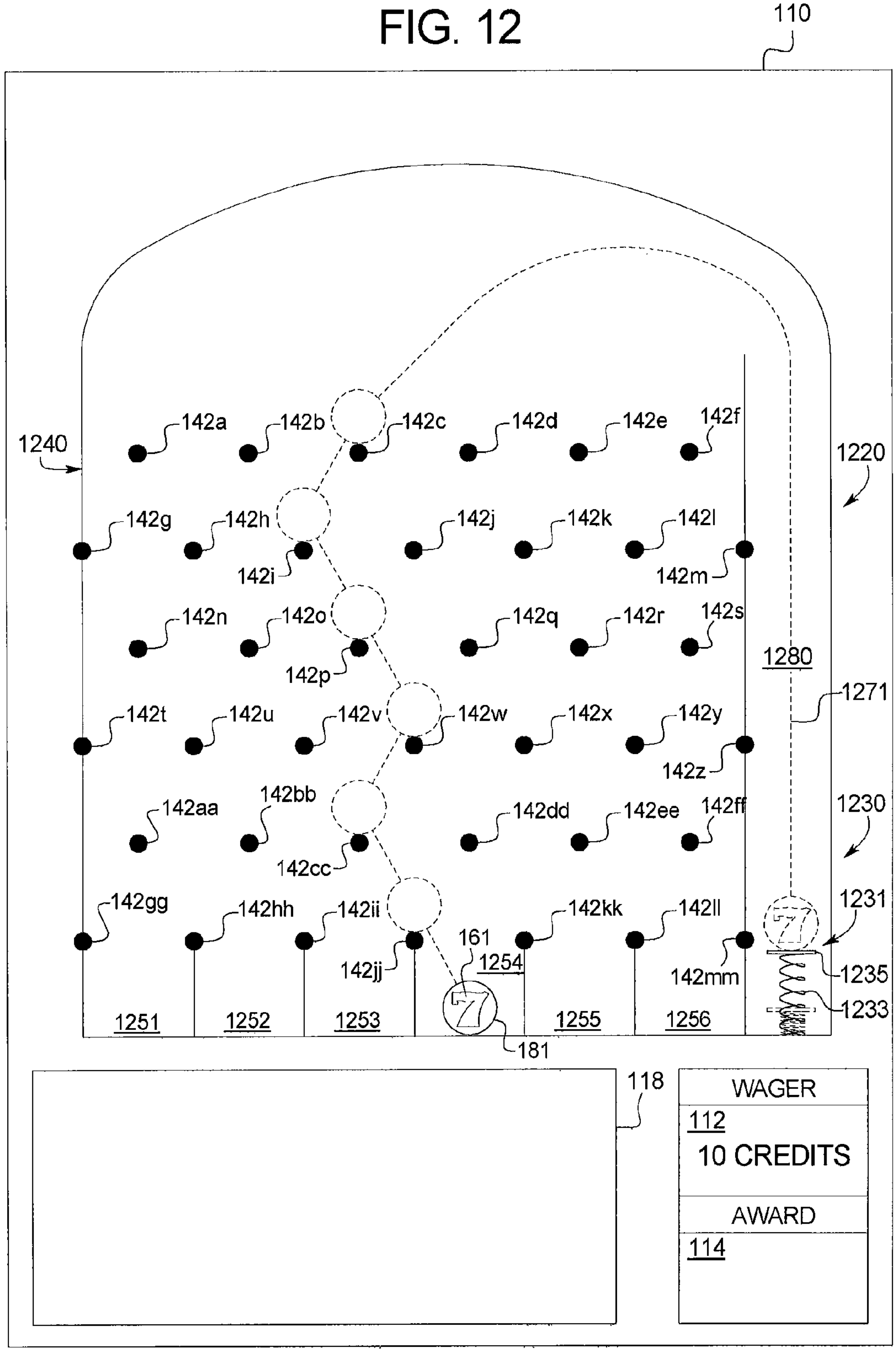
FIG. 12 is a front elevational view of a screen shot of the display device of another embodiment of the gaming system of the present disclosure including a symbol starting position having a spring and a symbol launch pad connected to the top of the spring and positioned at the bottom of a chute located on one side of the peg board game area.

In certain embodiments, the symbol starting area includes a single symbol starting position rather than a plurality of symbol starting positions. FIG. 12 illustrates one of these embodiments. In this illustrated example embodiment, peg board game area 1220 includes a symbol starting area 1230 including a symbol starting position 1231 positioned at the bottom of a chute 1280 located at one side of peg board game area 1220. Symbol starting position 1231 includes a spring 1233 and a symbol launch pad 1235 connected to the top of spring 1233. During play of this embodiment, the gaming system randomly selects one of the symbols and displays the selected symbol on symbol launch pad 1235. The gaming system determines a symbol path in one of the manners described above. The gaming system causes spring 1233 to compress (illustrated, in phantom) in accordance with the determined symbol path and releases spring 1233, causing the selected symbol to travel out of chute 1280 along the determined symbol path, enter obstacle area 1240, fall through obstacle area 1240 along the determined symbol path, and enter the symbol ending position at the end of the determined symbol path.

In the illustrated example, the gaming system randomly selects symbol "7" 161 (enclosed within circle 181), determines symbol path 1271, causes the spring to compress in accordance with determined symbol path 1271, and releases the spring. This causes symbol "7" 161 to travel out of chute 1280 along determined symbol path 1271, enter obstacle area 1240, fall through obstacle area 1240 along determined symbol path 1271, and enter symbol ending position 1254 at the end of determined symbol path 1271.

It should be appreciated that the gaming system may enable the player to control the compression of the spring, which enables the player to control the speed at which the selected symbol travels upon leaving the symbol launch pad (i.e., the symbol launch speed). The gaming system may also or alternatively enable the player to control the symbol launch direction and/or the launch spin of the symbol. It should further be appreciated that, additionally or alternatively, the gaming system may enable the player to directly control the symbol launch speed, launch direction, or launch spin. In one of these embodiments, the gaming system determines the symbol path based at least in part on the player-selected spring compression or symbol launch speed, launch direction, or launch spin. In another of these embodiments, the gaming device does not take the player-selected spring compression or symbol launch speed, launch direction, or launch spin into account when determining the symbol path. In this embodiment, the selected symbol will follow the determined symbol path regardless of the player's input in relation to symbol launch speed, launch direction, or launch spin.

Figure 13:
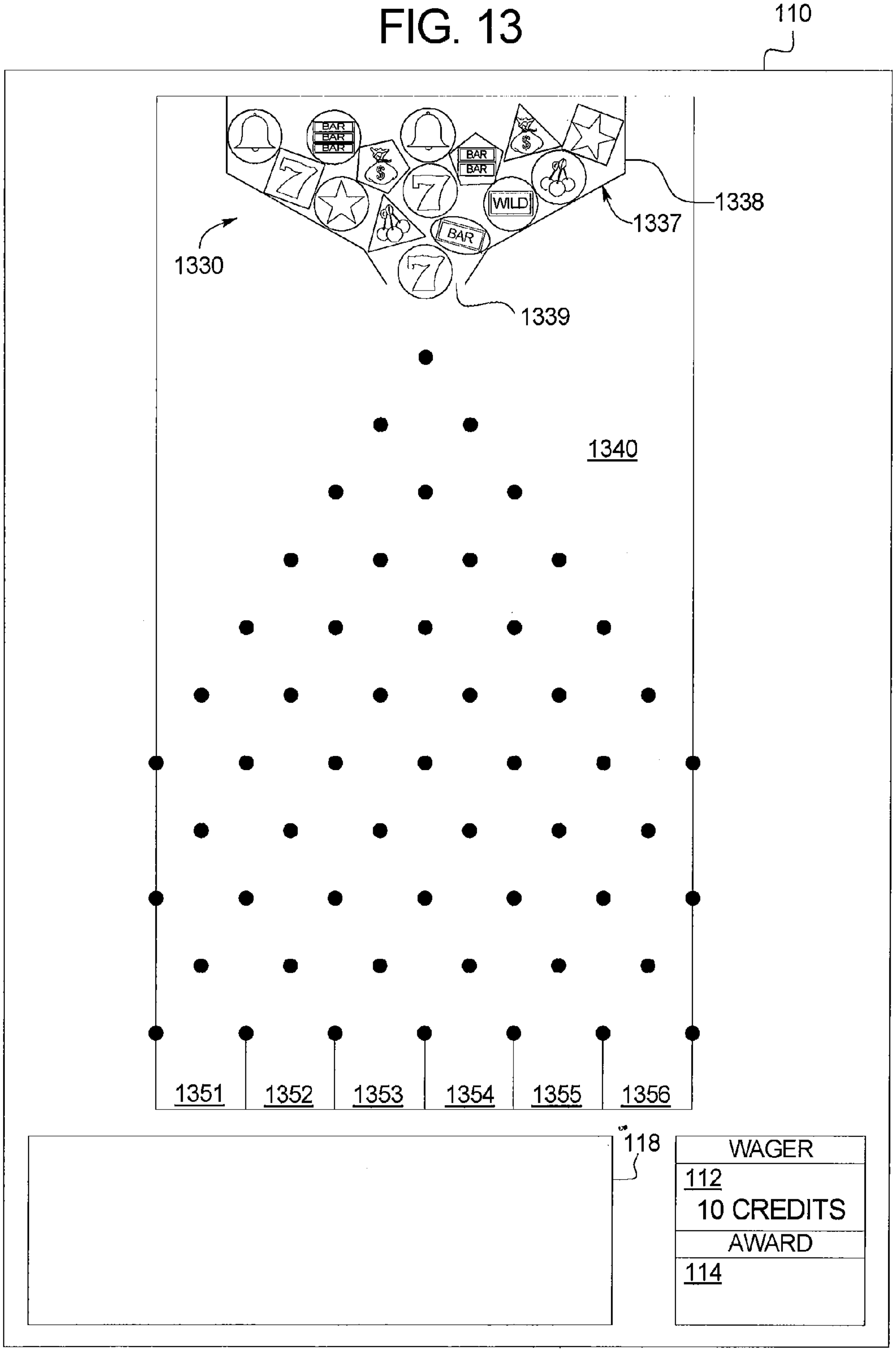
FIG. 13 is a front elevational view of a screen shot of the display device of another embodiment of the gaming system of the present disclosure including a hopper at the starting area that includes a symbol storage area storing a plurality of the symbols and an opening sized to enable one of the symbols at a time to fall from the hopper into the peg area.

FIG. 13 illustrates another embodiment of the gaming system of the present disclosure that includes a single symbol starting position. In this embodiment, a hopper 1337 is displayed at a starting area 1330. Hopper 1337 includes a symbol storage area 1338 that stores a plurality of the symbols and an opening 1339 sized to enable one of the symbols at a time to fall from hopper 1337 into obstacle area 1340. In operation, the symbol stored in symbol storage area 1338 that is adjacent to opening 1339 falls through opening 1339 into obstacle area 1340, falls through obstacle area 1340 along a determined symbol path, and lands in one of symbol ending positions 1351, 1352, 1353, 1354, 1355, and 1356. In other words, the gaming system selects the symbol in the hopper adjacent to the opening. Since the gaming system selects symbols that are visible in the hopper, this embodiment enables a player to view the symbols that will fall into the obstacle area in subsequent plays of the falling symbol obstacle board game. In one embodiment, the hopper is initially empty. After receiving a wager from a player, the gaming system generates a plurality of the symbols in any suitable manner and fills the hopper with the generated symbols in a random order, a predetermined order, or in any other suitable order. Game play then proceeds as generally described above. In certain of these embodiments, after a symbol or a predetermined quantity of symbols have been released from the hopper into the obstacle area, the gaming system generates a suitable quantity of replacement symbols and adds the replacement symbols to the hopper.

In another embodiment (not shown), the single symbol starting position is movable. In one of these embodiments, the movement of the symbol starting position and the control of symbols dropping from the symbol starting position is controlled solely by the gaming system. In another embodiment, the movement of the symbol starting position and/or the control of symbol dropping may be at least partially controlled by a player.

Figure 14:
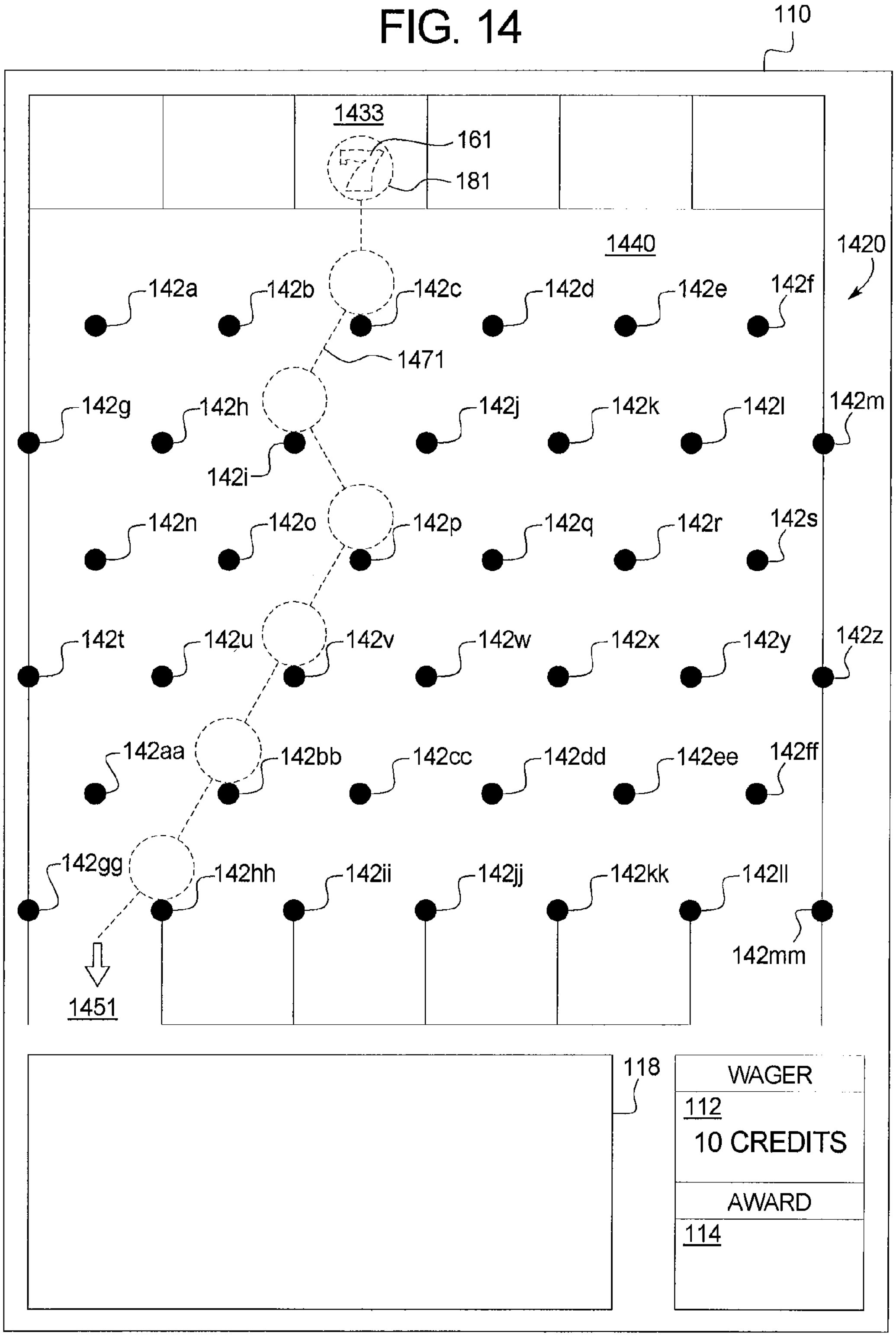
FIG. 14 is a front elevational view of a screen shot of the display device of another embodiment of the gaming system of the present disclosure including a plurality of floorless symbol ending positions.

In another embodiment, at least one of the symbol ending positions is floorless. When a symbol falls through the obstacle area along a symbol path into one of the floorless symbol ending positions, that symbol disappears or is otherwise removed from that symbol ending position (and the peg board game area). Accordingly, the floorless symbol ending positions do not display the symbols that fall through the floors or otherwise disappear. An example embodiment is illustrated in FIG. 14. In this embodiment, the gaming system selected symbol "7" 161 (encased within circle 181) and symbol starting position 1433, and determined symbol path 1471. Symbol "7" 161 is released from symbol starting position 1433 into a obstacle area 1440, and moves along determined symbol path 1471 into floorless symbol ending position 1451. Since symbol ending position 1451 is floorless, symbol "7" 161 disappears from symbol ending position 1451 and a peg board game area 1420.

It should be appreciated that, in another embodiment, symbols that enter the floorless symbol ending positions collect in a floorless symbol collection area. In one embodiment, the symbols that enter the floorless symbol ending positions collect in the floorless symbol collection area in the order in which they fall through the floorless symbol ending positions. In another embodiment, the symbols are randomly aligned in the floorless symbol collection area after falling through the floorless symbol ending positions. In another embodiment, the symbols that collect in the floorless symbol collection area can form line wins. In one embodiment, the symbols that collect in the floorless symbol collection area can form scatter pay wins. In another embodiment, the player may select one or more symbols in the floorless symbol collection area to replace one or more symbols in the symbol ending positions. In another embodiment, the player may select one or more symbols in the floorless symbol collection area to be recycled and reused at the symbol starting position of the current play of the game. In one embodiment, the player may select one or more symbols in the floorless symbol collection area to be recycled and reused at the symbol starting position of the next play of the game. It should be appreciated that, in some embodiments, the player may make such a selections upon the occurrence of a triggering event or triggering events. It should be appreciated that each type of selection may be associated with its own distinct triggering event.

Figure 15:
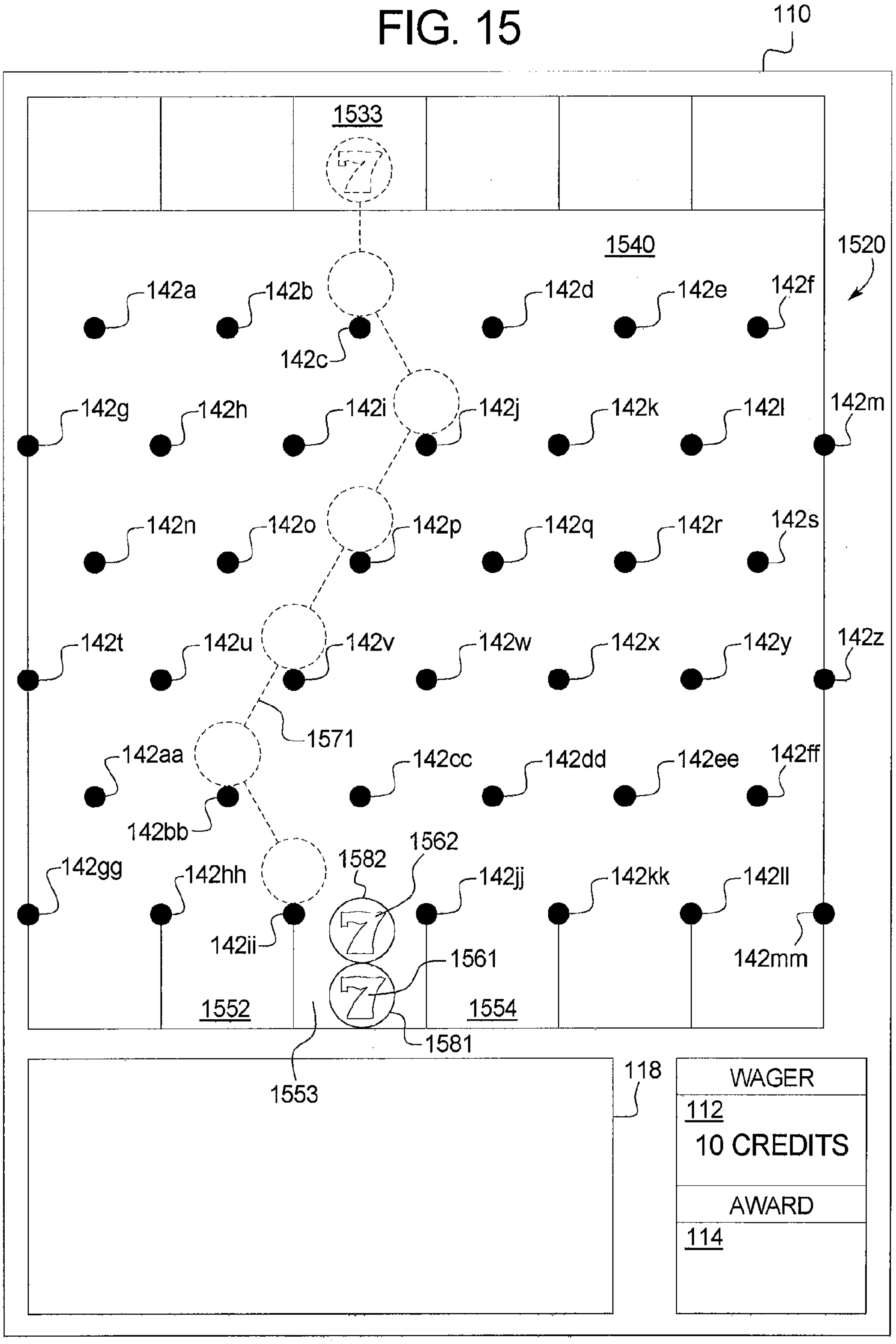
FIG. 15 is a front elevational view of a screen shot of the display device of another embodiment of the gaming system of the present disclosure in which symbols interact with one another.

In other embodiments, the symbols may interact with one another in a manner similar to the way in which the symbols interact with the obstacles. An example embodiment is illustrated in FIG. 15. As shown in FIG. 15, symbol "7" 1561 (encased within circle 1581) was initially selected by the gaming system and fell into symbol ending position 1553, at which symbol "7" 1571 is displayed. The gaming system subsequently selected symbol "7" 1562 (encased within circle 1582) and symbol starting position 1533, and determined symbol path 1571. Symbol "7" 1562 is released from symbol starting position 1533, and moves along determined symbol path 1571 toward symbol ending position 1553. When symbol "7" 1562 reaches symbol ending position 1553, however, symbol "7" 1562 cannot enter symbol ending position 1553 because symbol "7" 1561 blocks it from entering. Accordingly, symbol "7" 1562 rests atop symbol "7" 1561. Other falling symbols may interact with symbol "7" 1562. For example, if a falling symbol collides with symbol "7" 1562 in a certain way, symbol "7" 1562 may fall into symbol ending position 1552 or 1554 (provided that they are not occupied by another symbol).

Figure 16:
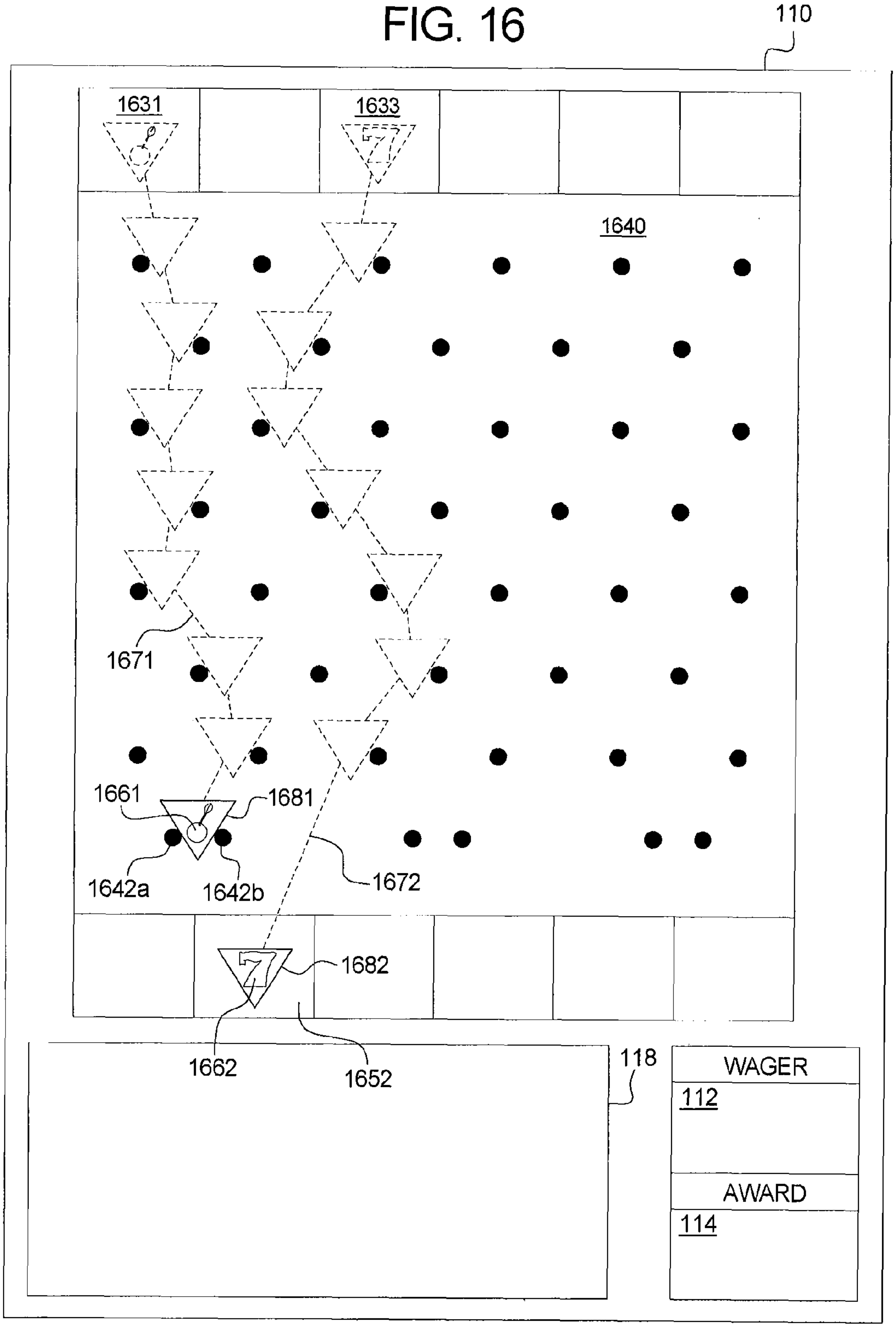
FIG. 16 is a front elevational view of a screen shot of the display device of another embodiment of the gaming system of the present disclosure including pegs having coordinates that are not equidistant from one another.

In other embodiments, the coordinates of the obstacles are not equidistant from one another. In other words, the distance between the coordinates of certain of the obstacles varies. In these embodiments, the shapes encasing the symbols may not fit between certain of the obstacles and, therefore, may get stuck at certain positions in the obstacle area. FIG. 16 illustrates one example of this embodiment. As shown in FIG. 16, CHERRY symbol 1661 (encased within triangle 1681) is released from symbol starting position 1631 and travels along symbol path 1671 until it reaches obstacles 1642*a* and 1642*b*. Due to the size of CHERRY symbol 1671 and its orientation, CHERRY symbol 161 cannot fit through obstacles 1642*a* and 1642*b* and, therefore, remains stuck between obstacles 1642*a* and 1642*b* for the duration of the play of the falling symbol obstacle board game or until another falling symbol dislodges it. Symbol "7" 1662, on the other hand, is of the same size and shape as CHERRY symbol 1661 and does not become stuck between obstacles as it travels from symbol starting position 1633 through obstacle area 1640 and into symbol ending position 1652.

Figure 17:
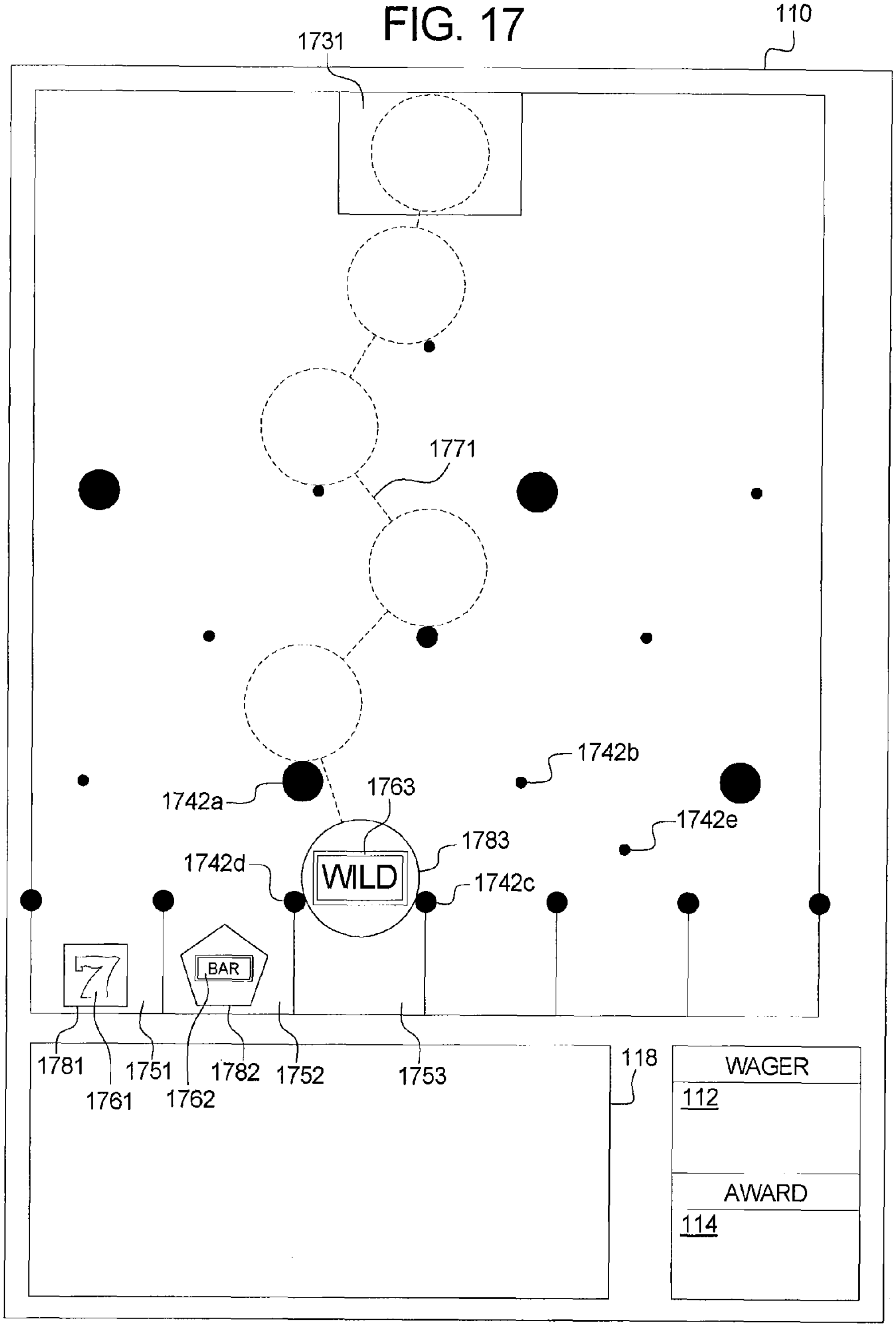
FIG. 17 is a front elevational view of a screen shot of the display device of another embodiment of the gaming system of the present disclosure including differently-sized symbols, symbols encased in different shapes, symbols encased in differently-sized shapes, differently-sized pegs, differently-sized symbol ending positions, and symbol ending positions in which certain of the symbols do not fit.

FIG. 17 illustrates another example embodiment of the gaming system of the present disclosure. In this embodiment, the obstacles are not of a uniform size and the obstacles are not spaced a uniform distance apart from one another. Specifically, in this example embodiment, obstacle 1742*a* is larger (i.e., has a larger diameter) than obstacles 1742*b*, 1742*c*, and 1742*d*, which are larger than obstacle 1742*e*. Similarly, the symbol ending positions are not of a uniform size. Specifically, symbol ending position 1762 is larger than symbol ending position 1753, which is larger than symbol ending position 1761. In certain embodiments certain symbols will not fit into certain of the symbol ending positions. An example of this is illustrated in FIG. 17. WILD symbol 1763 is encased within circle 1783 having a diameter that is larger than the opening of the symbol ending position 1753 defined by obstacles 1742*c* and 1742*d*. Accordingly, WILD symbol 1763 is not able to fall into symbol ending position 1763, and becomes stuck between obstacles 1742*c* and 1742*d*.

Figure 18A:
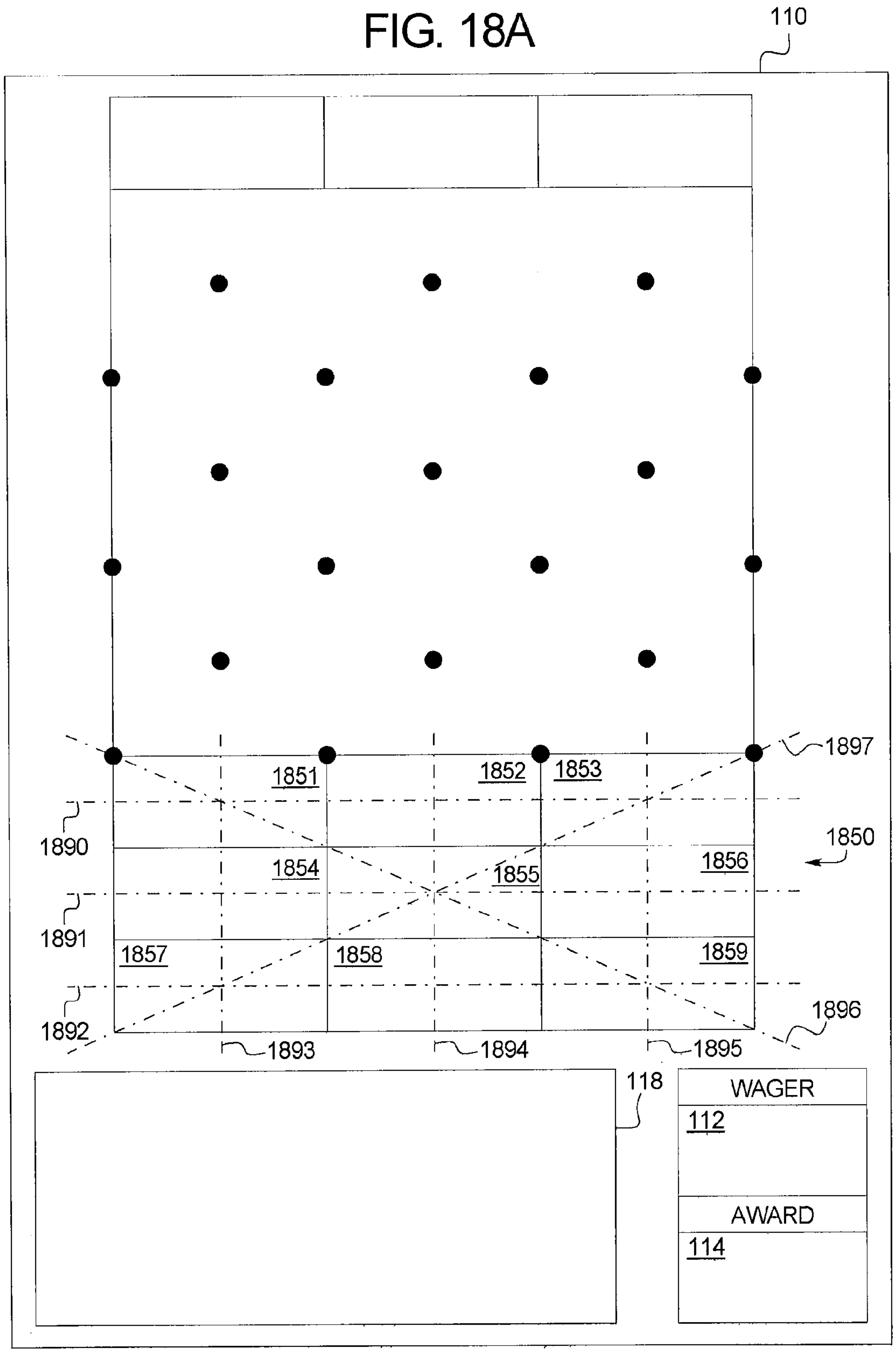
FIG. 18A is a front elevational view of a screen shot of the display device of another embodiment of the gaming system of the present disclosure including a two dimensional array of symbol ending positions and a plurality of paylines associated with the symbol ending positions.
Figure 18B:
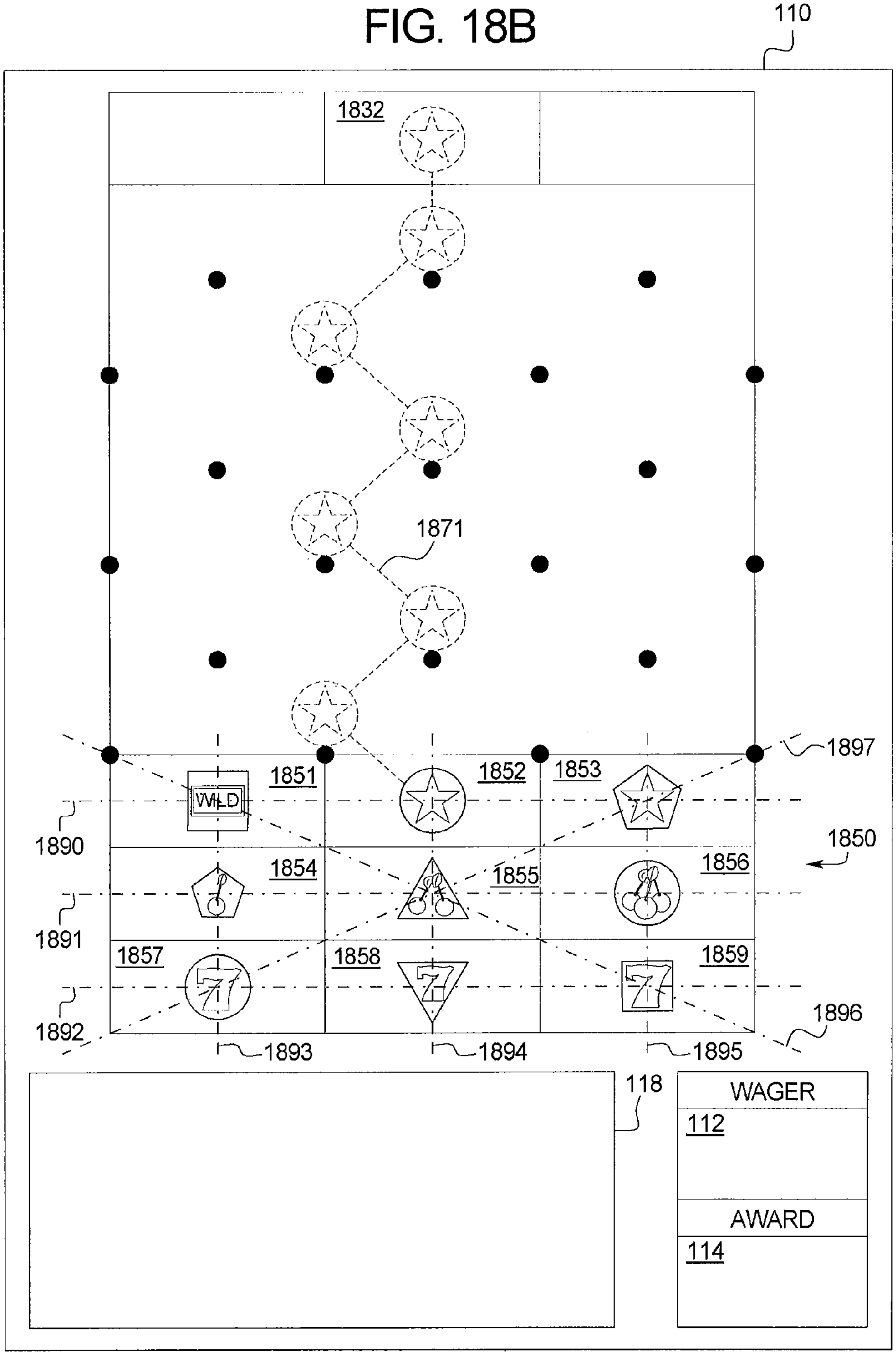
FIG. 18B is a front elevational view of a screen shot of the display device of the gaming system of FIG. 18A after each of the symbol ending positions has been filled by a symbol.

FIGS. 18A and 18B illustrate another example embodiment of the gaming system of the present disclosure. In this embodiment, the symbol ending area 1850 includes a two-dimensional array of symbol ending positions 1850, 1851, 1852, 1853, 1854, 1855, 1856, 1857, 1858, and 1859. The symbol ending positions are associated with a plurality of paylines 1890, 1891, 1892, 1893, 1894, 1895, 1896, and 1897. Specifically, payline 1890 is associated with symbol ending positions 1851, 1852, and 1853; payline 1891 is associated with symbol ending positions 1854, 1855, and 1856; payline 1892 is associated with symbol ending positions 1857, 1858, and 1859; payline 1893 is associated with symbol ending positions 1851, 1854, and 1857; payline 1894 is associated with symbol ending positions 1852, 1855, and 1858; payline 1895 is associated with symbol ending positions 1853, 1856, and 1859; payline 1896 is associated with symbol ending positions 1851, 1855, and 1859; and payline 1897 is associated with symbol ending positions 1853, 1855, and 1857. The gaming system enables a player to place a wager on at least one of the paylines.

In this embodiment, symbol ending positions 1851, 1854, and 1857 form a first column of symbol ending positions; symbol ending positions 1852, 1855, and 1858 for a second column of symbol ending positions; and symbol ending positions 1853, 1856, and 1859 form a third column of symbol ending positions. In operation, when a symbol falls into one of the columns of symbol ending positions, the symbol falls to the lowest symbol ending position in the column that is not occupied by a symbol. This enables the symbols to stack on top of one another until the entire column is filled (i.e., each symbol ending position in the column displays a symbol). Once each symbol ending position is occupied by, includes, or displays a symbol, as illustrated in FIG. 18B, the gaming system determines, for each wagered-on payline, whether any different predetermined winning combinations of the symbols are displayed at the symbol ending positions associated with that payline. If so, the gaming system provides the player with an award associated with that payline.

In certain other embodiments, rather than using paylines for award determination purposes, the gaming system employs a scatter pay feature as is known in the art. In one of these embodiments, the player is provided with an award if at least a designated quantity of scatter pay symbols are displayed at the symbol ending positions of the symbol ending area. In another of these embodiments, the player is provided with an award if at least a designated quantity of scatter pay symbols are displayed above the symbol ending areas. In other words, in certain of these embodiments, an award determination is made for symbols that are stuck within the obstacle area. In one of these embodiments, the player is provided with an award if at least a designated quantity of scatter pay symbols are displayed, collectively, in the symbol ending positions and above the symbol ending area. In yet another embodiment in which the floorless symbol collection area is implemented, the player is provided with an award when at least a designated quantity of scatter symbols are displayed in the floorless symbol collection area. In another embodiment in which the floorless symbol collection area is implemented, the player is provided with an award when at least a designated quantity of scatter symbols are displayed, collectively, in the symbol ending positions and in the floorless symbol collection area.

Figure 19A:
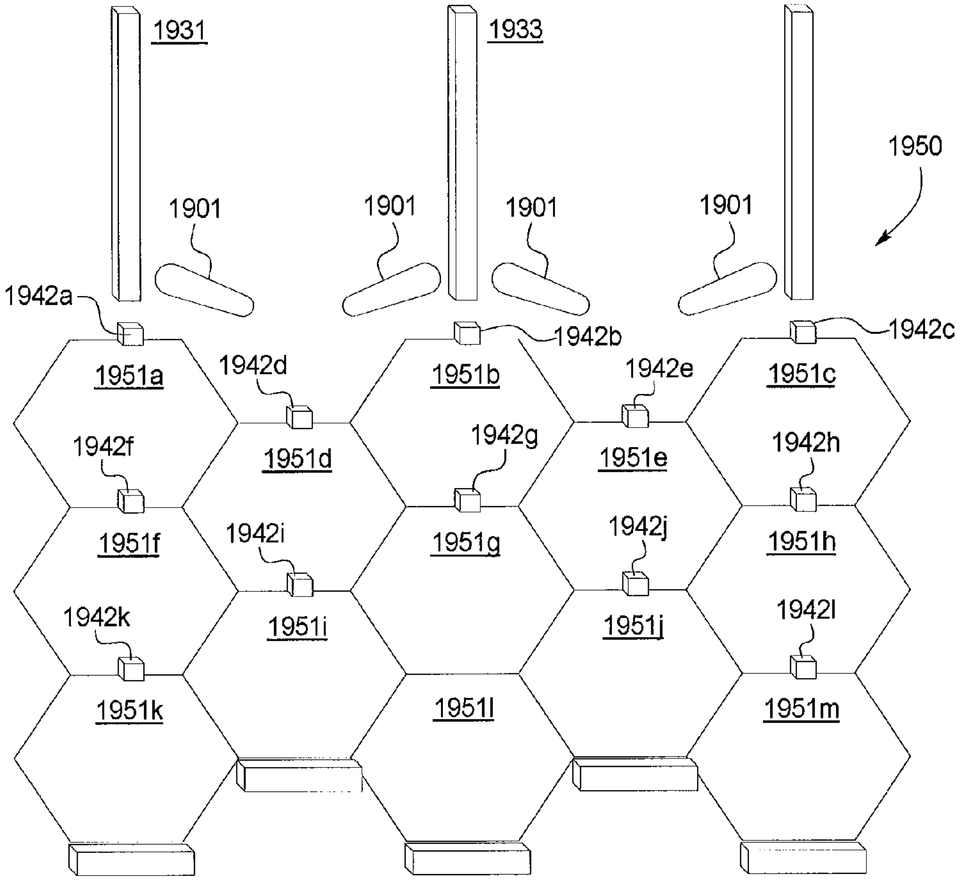
FIGS. 19A, 19B, and 19C are front elevational views of screen shots of the display device of another embodiment of the gaming system of the present disclosure wherein the obstacles are positioned within the symbol ending area.
Figure 19B:
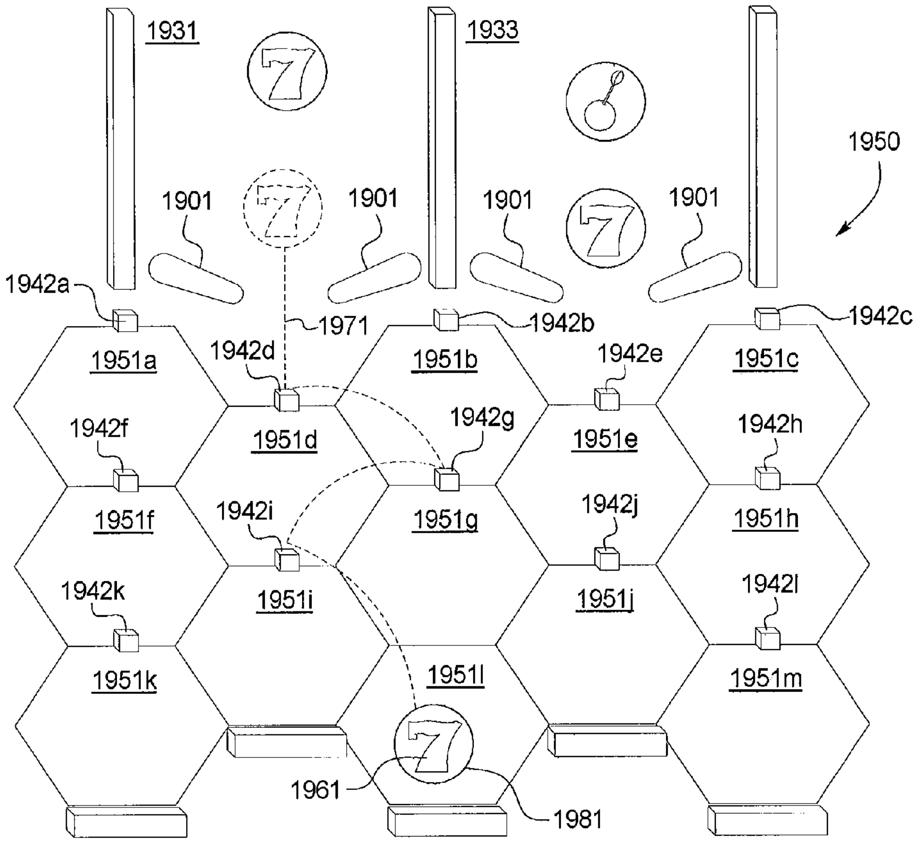
Figure 19C:
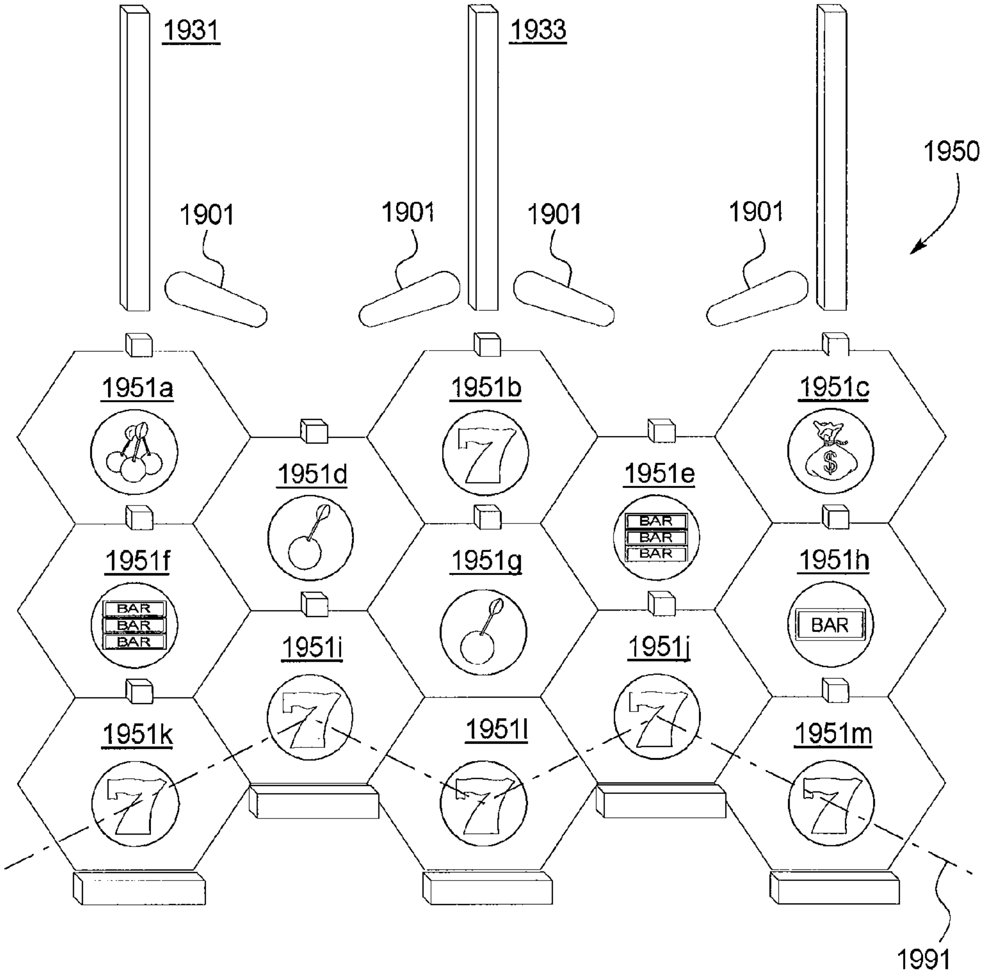

FIGS. 19A, 19B, and 19C illustrate an example of an embodiment of the falling symbol peg board game of the present disclosure in which the obstacles are positioned among the symbol ending positions. In this embodiment, symbol ending area 1950 acts as an obstacle area, and includes a two-dimensional array of symbol ending positions 1951*a*, 1951*b*, 1951*c*, 1951*d*, 1951*e*, 1951*f*, 1951*g*, 1951*h*, 1951*i*, 1951*j*, 1951*k*, 1951*l*, and 1951*m*. Symbol ending area 1950 includes a plurality of obstacles 1942*a*, 1942*b*, 1942*c*, 1942*d*, 1942*e*, 1942*f*, 1942*g*, 1942*h*, 1942*i*, 1942*j*, 1942*k*, and 1942*l*. This embodiment also includes two symbol starting areas 1931 and 1933 configured to display a plurality of the symbols. Each of the symbol starting areas includes two flippers 1901. In operation, the flippers move such that one symbol included in the symbol starting area is released into symbol ending area 1950, and then move such that the next symbol in line is not released into symbol ending area 1950. It should be appreciated that in certain embodiments the symbol starting positions do not include flippers.

When a symbol falls from one of the symbol starting areas 1931 or 1933 into the symbol ending area 1950, the symbol falls as if pulled by gravity to the lowest symbol ending position included in the symbol ending area 1950 that is not occupied by a symbol. This enables the symbols to stack on top of one another until each of the symbol ending positions displays a symbol. For example, as illustrated in FIG. 19B, symbol "7" 1961 is generated and displayed at symbol starting position 1931, and symbol path 1971 is determined. The gaming system displays symbol "7" 1961 falling through symbol ending area 1950 along determined symbol path 1961 as follows: symbol "7" 1961 falls from symbol starting position 1931 and collides with peg 1942*d*, symbol "7" 1961 falls to the right of peg 1942*d* and collides with peg 1942*g*, symbol "7" 1961 falls to the left of peg 1942*g* and collides with peg 1942*i*, symbol "7" 1961 falls to the right of peg 1942*i* into symbol ending position 19511. Once each symbol ending position is occupied by, includes, or displays a symbol, as illustrated in FIG. 19C, the gaming system makes an award determination. It should be appreciated that the scatter pay feature described above may be implemented for award determination purposes.

In one embodiment, the gaming system makes an award determination based on one or more wagered on paylines. In this embodiment, for example, the player places a wager on one or more paylines, such as payline 1991. If a winning symbol combination is displayed along the payline, the player is provided an award associated with that wager and that payline. In the example embodiment illustrated in FIG. 19C, the player placed a wager on payline 1991, and receives an award based on that wager because payline 1991 displays winning symbol combination SEVEN-SEVEN-SEVEN-SEVEN-SEVEN.

It should be appreciated that this embodiment of the falling symbol obstacle board game may include a cascading symbol or tumbling reel feature, as is known in the art. In one example of this embodiment, after each of the symbol ending positions displays a symbol, the gaming system determines whether, for each wagered-on payline, whether any different predetermined winning combinations of the symbols are displayed at the symbol ending positions associated with that payline. If so, the gaming system provides the player with an award associated with that payline. The gaming system then removes any symbols that were part of the winning symbol combinations from their respective symbol ending positions. For example, each symbol position has its own drop chute independent of all other symbol positions and the ability to block higher-up symbols from falling down until the original symbol has dropped out along its chute and the chute has subsequently closed. Any symbols displayed above (i.e., on top of) any empty symbol ending positions "fall" (i.e., "cascade" or "tumble") downward into the empty symbol ending positions. New symbols are then selected to fill any empty symbol ending positions. In this embodiment, symbols are selected and fall through the obstacle area until the empty symbol ending positions each display one of the symbols.

In certain embodiments, at least one of the obstacles has a flipper associated with it (attached thereto, for example) that may interact with a falling symbol. Specifically, the flipper may influence how the falling symbol falls through the obstacle area. In one embodiment, when the falling symbol contacts the flipper, the flipper arm forces the falling symbol to fall in a certain direction (e.g., up, down, left, or right). In one embodiment, the flipper is stationary and the way in which the flipper affects the falling symbol is based upon the manner in which the symbol is falling when it contacts the flipper and the orientation (angle, for example) of the flipper itself. In another embodiment, the flipper moves. In this embodiment, the movement of the flipper also affects the manner in which the symbol falls through the obstacle area. In one embodiment, the flipper is oriented horizontally between two obstacles, thereby preventing a falling symbol from falling between those two obstacles. In one example of this embodiment, the flipper is positioned horizontally between the two obstacles above a symbol ending position including a symbol, thereby preventing another symbol from falling into that symbol ending position. In one embodiment, the flipper is oriented such that is has no effect on one or more falling symbols. In this embodiment, for example, a triggering condition may have to occur for the flipper to interact with and influence the falling symbols. In another embodiment, each of a plurality of the obstacles has a flipper. In one embodiment, at least one of the flippers is controlled by the player. In another embodiment, the combination of a plurality of the flippers may create a dead end area from which a falling symbol cannot escape once it enters the dead end area. In one example of this embodiment, a triggering condition must occur for the falling symbol to escape the dead end area.

In another embodiment, the award determination is performed using a ways to win calculation as is known in the art and as is described in detail above.

It should be appreciated that the array of symbol ending positions may include any suitable quantity of symbol ending positions. It should also be appreciated that the symbol ending positions may be associated with any suitable quantity or type of paylines. In the embodiment described above with respect to FIGS. 4, 5, 6, 7, 8, 9, 10, and 11, for example, one payline may be associated with symbol ending positions 151, 152, 153, 154, 155, and 156.

It should be appreciated that any of the above embodiments may be adapted for use in a physical gaming machine utilizing a physical obstacle board and physical shapes and symbols rather than a video board and video shapes and symbols. In one of these physical obstacle board embodiments, the gaming system includes an optical scanner and the shapes and/or symbols include a code (such as a bar code) configured to be scanned and read by the optical scanner. When the shapes and/or symbols are falling through the obstacle board, the optical scanner scans the falling shapes and/or symbols such that the gaming system knows which shapes and symbols are falling through the obstacle board. In another of these embodiments, each shape and/or symbol includes an RFID tag and the gaming system reads the RFID tag with an RFID transceiver, which also enables the gaming system to determine which shapes and/or symbols are falling through the obstacle board. In another embodiment, both sides of the shape display the symbol, and an optical scanner of the gaming system scans and reads the symbol. In certain embodiments, the gaming system only determines the identity of shapes and/or symbols included in the symbol ending positions. It should be appreciated that any manner of determining which shapes and/or symbols fall through the obstacle board may be utilized.

In certain embodiments, the symbol is static within its shape, meaning that the orientation of the symbol depends upon the orientation of the shape. In other embodiments, the symbol is configured to rotate independently of the shape, meaning that the orientation of the symbol does not depend upon the orientation of the shape. In one of these embodiments including a physical obstacle board employing physical shapes, an axle connects the symbol to the shape and is positioned above the center of gravity of the symbol. This causes the symbol to oriented upwards relative to gravity regardless of the orientation of the shape.

Figure 20A:
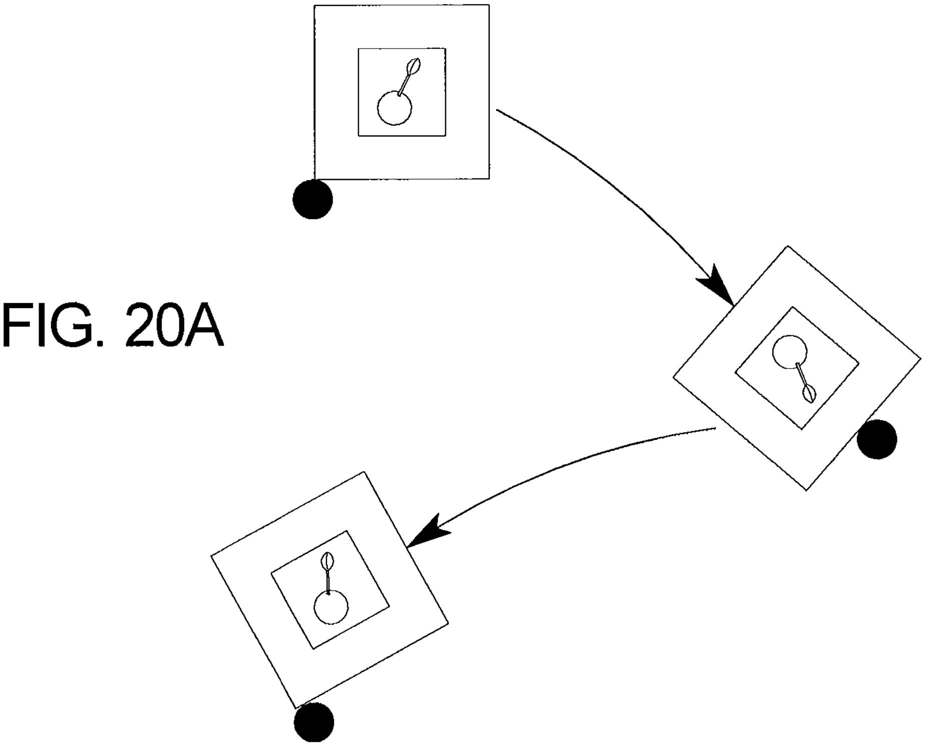
FIG. 20A is a front elevational view of one of the falling symbols encased within a shape in a static orientation.
Figure 20B:
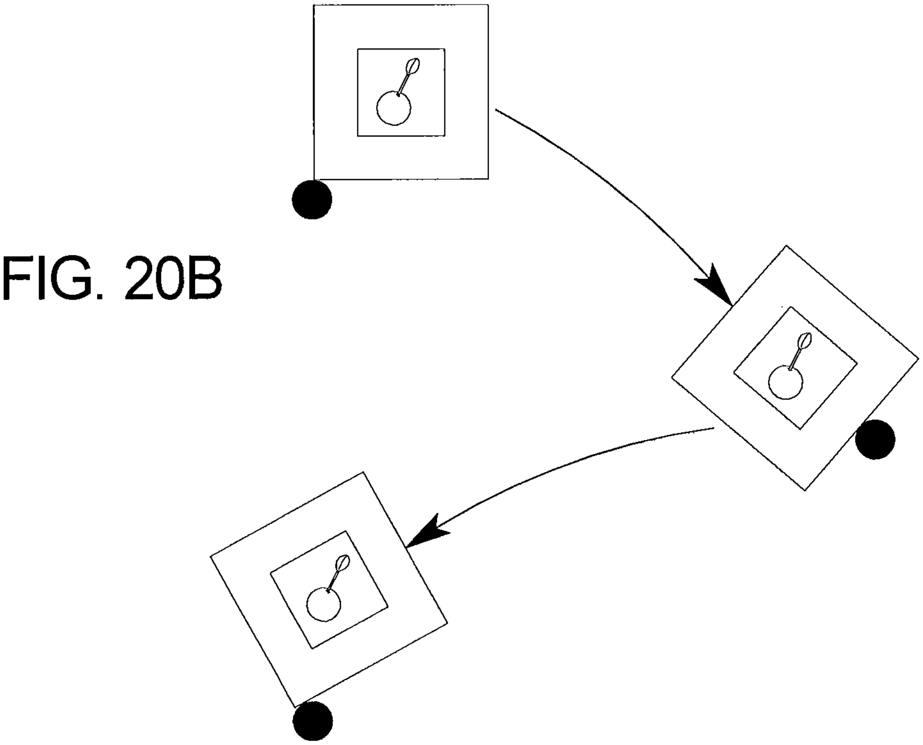
FIG. 20B is a front elevational view of one of the falling symbols encased within a shape in a variable orientation.

In certain other embodiments utilizing physical shapes, the symbol is depicted using a display device included within the shape. In one of these embodiments, the orientation of the displayed symbol is static relative to the shape, meaning that the orientation of the symbol depends upon the orientation of the shape. FIG. 20A illustrates one of these embodiments. The orientation of the cherry symbol orientation is dependent upon the shape's orientation. In other embodiments, the orientation of the displayed symbol may be adjusted within the resolution limitations of the display device. In one such example, the shape contains an LCD display or any other suitable type of display (such as any of the display devices described above) and a processor that can select one of a plurality of display orientations that aligns the displayed symbol with gravity as defined by a built-in accelerometer. FIG. 20B illustrates one of these embodiments. Specifically, FIG. 20B illustrates an embodiment in which the display device displays the cherry symbol in the same orientation no matter the orientation of the shape.

It should be understood that various changes and modifications to the presently preferred embodiments described herein will be apparent to those skilled in the art. Such changes and modifications may be made without departing from the spirit and scope of the present invention and without diminishing its intended advantages. It is therefore intended that such changes and modifications be covered by the appended claims.

The invention is claimed as follows:

1. A gaming system including:

a housing;

at least one display device supported by the housing;

a plurality of input devices supported by the housing, the plurality of input devices including an acceptor;

at least one processor; and at least one memory device storing a plurality of instructions which, when executed by the at least one processor, cause the at least one processor to operate with the at least one display device and the plurality of input devices to:

(a) if a physical item associated with a monetary value is received by the acceptor, establish a credit balance based at least in part on the monetary value associated with the received physical item;

(b) if a wager button is actuated, place a wager for a play of a wagering game, said wager deducted from the credit balance;

(c) display:

(i) a symbol starting area including a plurality of symbol starting positions;

(ii) a symbol ending area including a plurality of symbol ending positions, the symbol ending area being spaced apart in relation to the symbol starting area, each of the symbol ending positions being configured to display one of a plurality of different symbols; and (iii) a plurality of obstacles between the symbol starting area and the symbol ending area;

(d) select one of the plurality of symbols;

(e) receive a selection of one of the symbol starting positions;

(f) display the selected symbol moving from said selected symbol starting position into one of the symbol ending positions along one of a plurality of different symbol paths through the obstacles, said one of the symbol ending positions being determined based, at least in part, on a random determination;

(g) if said one of the symbol ending positions does not already display another symbol, display the selected symbol at said one of the symbol ending positions;

(h) if said one of the symbol ending positions already displays another symbol, replace said other symbol with the selected symbol such that the selected symbol is displayed at said one of the symbol ending positions;

(i) repeat (d) to (h) until a termination condition is satisfied;

(j) after the termination condition is satisfied, determine whether at least one of a plurality of different predetermined winning combinations of the symbols is displayed at the symbol ending positions;

(k) display an award for any displayed winning combinations of the symbols; and (l) if a cashout button is actuated, initiate a payout associated with the credit balance.

2. The gaming system of claim 1, wherein at least two of the plurality of symbols are of different sizes.

3. The gaming system of claim 2, wherein the obstacles are displayed such that:

(a) at least one of the plurality of symbols does not fit through the space defined by two of the obstacles, and (b) at least one of the plurality of symbols fits through the space defined by said two of the obstacles.

4. The gaming system of claim 2, wherein at least one of the symbol ending positions is sized such that:

(a) at least one of the plurality of symbols does not fit into the at least one symbol ending position, and (b) at least one of the plurality of symbols fits into the at least one symbol ending position.

5. The gaming system of claim 1, wherein each of the plurality of symbols is displayed as being encased within one of a plurality of different shapes.

6. The gaming system of claim 1, which includes at least one payline associated with a plurality of the symbol ending positions.

7. The gaming system of claim 6, wherein the plurality of instructions, when executed by the at least one processor, cause the at least one processor to determine, for each of the at least one payline, whether at least one of the winning combinations of the symbols is displayed at the symbol ending positions associated with said payline and provide the player an award associated with any winning combinations of the symbols displayed at said symbol ending positions associated with said payline.

8. The gaming system of claim 1, wherein the symbol ending positions are displayed in a two dimensional array.

9. The gaming system of claim 1, wherein the termination condition is satisfied when each of the symbol ending positions displays one of the plurality of symbols.

10. The gaming system of claim 1, wherein the termination condition is satisfied when a designated quantity of the plurality of symbols have been released from the symbol starting area.

11. The gaming system of claim 1, wherein the symbol starting area includes a hopper storing a plurality of the plurality of symbols and the symbols selected by the at least one processor are selected from the plurality of the plurality of symbols stored in the hopper.

12. The gaming system of claim 1, wherein at least one of the symbol ending positions is floorless, and the plurality of instructions, when executed by the at least one processor, cause the at least one processor to operate with the at least one display device to, if the selected symbol falls into one of the floorless symbol ending positions, not display the selected symbol at said floorless symbol ending position.

13. A method of operating a gaming system, said method including:

(a) if a physical item associated with a monetary value is received by an acceptor, causing at least one processor to execute a plurality of instructions stored in at least one memory device to establish a credit balance based at least in part on the monetary value associated with the received physical item;

(b) if a wager button is actuated, causing the at least one processor to execute the plurality of instructions to place a wager for a play of a wagering game, said wager deducted from the credit balance;

(c) causing the at least one processor to execute the plurality of instructions to operate with at least one display device to display:

(i) a symbol starting area including a plurality of symbol starting positions;

(ii) a symbol ending area including a plurality of symbol ending positions, the symbol ending area being spaced apart in relation to the symbol starting area, each of the symbol ending positions being configured to display one of a plurality of different symbols; and (iii) a plurality of obstacles between the symbol starting area and the symbol ending area;

(d) causing the at least one processor to execute the plurality of instructions to select one of the plurality of symbols;

(e) causing the at least one processor to execute the plurality of instructions to operate with the at least one input device to receive a selection of one of the symbol starting positions;

(f) causing the at least one processor to execute the plurality of instructions to operate with the at least one display device to display the selected symbol moving from said selected symbol starting position into one of the symbol ending positions along one of a plurality of different symbol paths through the obstacles, said one of the symbol ending positions being determined based, at least in part, on a random determination;

(g) if said one of the symbol ending positions does not already display another symbol, causing the at least one processor to execute the plurality of instructions to operate with the at least one display device to display the selected symbol at said one of the symbol ending positions;

(h) if said one of the symbol ending positions already displays another symbol, causing the at least one processor to execute the plurality of instructions to operate with the at least one display device to replace said other symbol with the selected symbol such that the selected symbol is displayed at said one of the symbol ending positions;

(i) repeating (d) to (h) until a termination condition is satisfied;

(j) causing the at least one processor to execute the plurality of instructions to, after the termination condition is satisfied, determine whether at least one of a plurality of different predetermined winning combinations of the symbols is displayed at the symbol ending positions;

(k) causing at least one processor to execute the plurality of instructions to operate with the at least one display device to display an award for any displayed winning combinations of the symbols; and (l) if a cashout button is actuated, causing the at least one processor to execute the plurality of instructions to initiate a payout associated with the credit balance.

14. The method of claim 13, which includes causing the at least one processor to execute the plurality of instructions to operate with the at least one display device to display one of the selected symbols as having a different size than another one of the selected symbols.

15. The method of claim 14, which includes causing the at least one processor to execute the plurality of instructions to operate with the at least one display device to display the obstacles such that:

(a) at least one of the plurality of symbols does not fit through the space defined by two of the obstacles, and (b) at least one of the plurality of symbols fits through the space defined by said two of the obstacles.

16. The method of claim 14, which includes causing the at least one processor to execute the plurality of instructions to operate with the at least one display device to display at least one of symbol ending positions sized so that:

(a) at least one of the plurality of symbols does not fit into the at least one symbol ending position, and (b) at least one of the plurality of symbols fits into the at least one symbol ending position.

17. The method of claim 13, which includes causing the at least one processor to execute the plurality of instructions to operate with the at least one display device to display each of the plurality of symbols as being encased within one of a plurality of different shapes.

18. The method of claim 13, which includes at least one payline associated with a plurality of the symbol ending positions.

19. The method of claim 18, wherein causing the at least one processor to execute the plurality of instructions to determine whether at least one of a plurality of different predetermined winning combinations of the symbols is displayed at the symbol ending positions and provide the player an award for any displayed winning combinations of the symbols includes causing the at least one processor to execute the plurality of instructions to determine, for each of the at least one payline, whether at least one of the winning combinations of the symbols is displayed at the symbol ending positions associated with said payline and provide the player an award associated with any winning combinations of the symbols displayed at said symbol ending positions associated with said payline.

20. The method of claim 13, which includes causing the at least one processor to execute the plurality of instructions to operate with the at least one display device to display the symbol ending positions in a two dimensional array.

21. The method of claim 13, wherein the termination condition is satisfied when each of the symbol ending positions displays one of the plurality of symbols.

22. The method of claim 13, wherein the termination condition is satisfied when a designated quantity of the plurality of symbols have been released from the symbol starting area.

23. The method of claim 13, which includes causing the at least one processor to execute the plurality of instructions to operate with the at least one display device to display a hopper storing a plurality of the plurality of symbols at the symbol starting area.

24. The method of claim 23, wherein causing the at least one processor to execute the plurality of instructions to select one of the plurality of symbols includes causing the at least one processor to select one of the plurality of the plurality of symbols stored in the hopper.

25. The method of claim 13, wherein at least one of the symbol ending positions is floorless, and which includes causing the at least one processor to execute the plurality of instructions to operate with the at least one display device to, when the selected symbol falls into one of the floorless symbol ending positions, not display the selected symbol at said floorless symbol ending position.

26. The method of claim 13, which is provided through a data network.

27. The method of claim 26, wherein the data network is the internet.

28. A gaming system including:

a housing;

at least one display device supported by the housing;

a plurality of input devices supported by the housing, the plurality of input devices including an acceptor;

at least one processor; and at least one memory device storing a plurality of instructions which, when executed by the at least one processor, cause the at least one processor to operate with the at least one display device and the plurality of input devices to:

(a) if a physical item associated with a monetary value is received by the acceptor, establish a credit balance based at least in part on the monetary value associated with the received physical item;

(b) if a wager button is actuated, place a wager for a play of a wagering game, said wager deducted from the credit balance;

(c) display:

(i) a symbol starting area including a plurality of symbol starting positions;

(ii) a symbol ending area including a plurality of symbol ending positions, the plurality of symbol ending positions including a first row of at least one symbol ending position displayed above a second row of at least one symbol ending position, each of the symbol ending positions being configured to display one of a plurality of different symbols; and (iii) a plurality of obstacles, a plurality of the obstacles being positioned within the symbol ending area, at least one of the obstacles being positioned between the first and second rows;

(d) select one of the plurality of symbols;

(e) receive a selection of one of the symbol starting positions from the player;

(f) display the selected symbol moving from said selected symbol starting position into one of the symbol ending positions along one of a plurality of different symbol paths through the obstacles, said one of the symbol ending positions being determined based, at least in part, on a random determination;

(g) display the selected symbol at said one of the symbol ending positions;

(h) repeat (d) to (g) until a termination condition is satisfied;

(i) after the termination condition is satisfied, determine whether at least one of a plurality of different predetermined winning combinations of the symbols is displayed at the symbol ending positions;

(j) display an award for any displayed winning combinations of the symbols; and (k) if a cashout button is actuated, initiate a payout associated with the credit balance.

29. The gaming system of claim 28, wherein each of the obstacles is positioned within the symbol ending area.

30. The gaming system of claim 28, wherein each of the obstacles is positioned between at least two of the symbol ending positions.

31. The gaming system of claim 28, wherein a first plurality of the obstacles is positioned within the symbol ending area and a second plurality of the obstacles is positioned outside of the symbol ending area.

32. The gaming system of claim 28, wherein each of the plurality of symbols is displayed as being encased within one of a plurality of different shapes.

33. The gaming system of claim 28, which includes at least one payline associated with a plurality of the symbol ending positions.

34. The gaming system of claim 33, wherein the plurality of instructions, when executed by the at least one processor, cause the at least one processor to determine, for each of the at least one payline, whether at least one of the winning combinations of the symbols is displayed at the symbol ending positions associated with said payline and provide the player an award associated with any winning combinations of the symbols displayed at said symbol ending positions associated with said payline.

35. The gaming system of claim 28, wherein the symbol ending positions are displayed in a two dimensional array.

36. The gaming system of claim 28, wherein the termination condition is satisfied when each of the symbol ending positions displays one of the plurality of symbols.

37. The gaming system of claim 28, wherein the termination condition is satisfied when a designated quantity of the plurality of symbols have been released from the symbol starting area.

38. The gaming system of claim 28, wherein the symbol starting area includes two hoppers each storing a plurality of the plurality of symbols and the symbols selected by the at least one processor are selected from the plurality of the plurality of symbols stored in said hoppers.

39. The gaming system of claim 28, wherein at least one of the symbol ending positions is floorless, and the plurality of instructions, when executed by the at least one processor, cause the at least one processor to operate with the at least one display device to, if the selected symbol falls into one of the floorless symbol ending positions, not display the selected symbol at said floorless symbol ending position.

40. The gaming system of claim 28, wherein the plurality of instructions, when executed by the at least one processor, cause the at least one processor to operate with the at least one display device to, for a selected symbol, if the symbol ending position for the selected symbol already displays another symbol, replace said other symbol with the selected symbol.

* * * * *